US012769026B1

(12) United States Patent
Ghazwani

(10) Patent No.: US 12,769,026 B1
(45) Date of Patent: Oct. 20, 2026

(54) LOCATING HYDROCARBONS BY CHARACTERIZING GAS EXSOLUTION

(71) Applicant: Saudi Arabian Oil Company, Dhahran (SA)

(72) Inventor: Assad Hadi Ghazwani, Muharraq (BH)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 19/363,181

(22) Filed: Oct. 20, 2025

(51) Int. Cl.
*G01V 11/00* (2006.01)
*E21B 49/02* (2006.01)
*E21B 49/08* (2006.01)
*G06V 10/82* (2022.01)

(52) U.S. Cl.
CPC ............ *G01V 11/002* (2013.01); *E21B 49/02* (2013.01); *E21B 49/08* (2013.01); *E21B 2200/22* (2020.05); *G06V 10/82* (2022.01)

(58) Field of Classification Search
CPC ........ G01V 1/282; G01V 1/301; G01V 1/306; G01V 1/50; G01V 1/48; G06N 3/09; G06N 3/045; G06N 3/0464; G06N 3/08; G06N 20/00; E21B 2200/20; E21B 2200/22; E21B 49/00; E21B 49/005; E21B 47/00; E21B 49/003
See application file for complete search history.

(56) References Cited

U.S. PATENT DOCUMENTS 4,967,401 A * 10/1990 Barney .................. G01V 1/003 367/45
6,374,185 B1 * 4/2002 Taner ....................... G01V 1/40 702/14
11,428,835 B2 * 8/2022 Wei ...................... G06N 3/0464
11,630,224 B2 * 4/2023 Roy ....................... G01V 1/282 367/73
2020/0019882 A1 * 1/2020 Garg ................... G06F 21/6218
2020/0088897 A1 * 3/2020 Roy ..................... G06N 3/0464
2021/0041596 A1 * 2/2021 Kushwaha ............. G01V 1/282
2023/0117096 A1 * 4/2023 Nguyen ................. G01V 1/301 702/14
2023/0258838 A1 * 8/2023 Roy ....................... G01V 1/003 367/73
2023/0323760 A1 * 10/2023 Al Ghaithi .............. E21B 43/26 703/7

* cited by examiner

*Primary Examiner* — Kipp C Wallace
(74) *Attorney, Agent, or Firm* — Fish & Richardson P.C.

(57) ABSTRACT

A method of drilling a hydrocarbon production well in a subsurface formation. The method includes training a convolutional neural network (CNN) using training data including information of gas exsolution, a seismic indicator, a chemical indicator, and a petrophysical indicator. The method further includes providing an input image including a seismic cross-section of a subsurface formation to the CNN, where the subsurface formation includes an uplifted or faulted region. The method further includes providing chemical information of hydrocarbons present in a location within the subsurface formation. The chemical information is obtained from a fluid sample collected from the location. The method further includes providing petrophysical information at the location, and computing a probability of gas exsolution using the CNN based on the seismic cross-section, the chemical information, and the petrophysical information. Based on the probability, locations of structural traps where hydrocarbons accumulate in the subsurface formation can be identified.

20 Claims, 18 Drawing Sheets

LOCATING HYDROCARBONS BY CHARACTERIZING GAS EXSOLUTION

TECHNICAL FIELD

This specification generally relates to hydrocarbon exploration, drilling, and production, and more particularly, locating hydrocarbon resources based on gas exsolution.

BACKGROUND

Modeling the subsurface includes creating a representation of subsurface geology and predicting fluid behavior within the reservoir. Data associated with the subsurface is obtained and analyzed to create an integrated dataset to understand the structures of the subsurface. For example, seismic surveys are conducted to obtain detailed images of subsurface structures by generating seismic waves and recording their reflections. Well logs, recorded during drilling, provide information about the properties of rock layers, such as porosity, permeability, and fluid content. Core samples, which are physical samples of rock extracted from the reservoir, are analyzed to understand their physical and chemical properties. Additionally, historical production data from existing wells are gathered to assess the reservoir's performance over time.

In tectonically active regions, rock formations are often disrupted by faulting, leading to the development of uplifted and faulted blocks. These blocks form when stress within the Earth's crust causes fractures, or faults, along which sections of rock are displaced. Uplifted blocks, also known as horsts, are elevated relative to surrounding terrain due to vertical movement along normal faults. Conversely, down-dropped blocks, or grabens, form adjacent to these uplifted areas. This structural deformation plays a critical role in shaping the landscape and influences subsurface fluid migration, making it significant in geological mapping and resource exploration.

Within uplifted and faulted blocks, exsolved gas can accumulate as a result of pressure and temperature changes in the formation. As buried formations are uplifted and fractured, dissolved gases may come out of solution from fluids or melts, migrating into newly formed fractures and porous zones. In hydrocarbon exploration, understanding the behavior of exsolved gas in oil reservoirs, particularly in uplifted and faulted blocks, improves production strategies and maximizes resource assessment.

SUMMARY

This specification describes an approach to locating hydrocarbons based on gas exsolution from oil. Geochemical and petrophysical techniques are integrated using artificial intelligence (AI) models that accurately predict the presence of exsolved gas in oil reservoirs situated in uplifted and faulted geological formations using multivariate pattern recognition. In particular, multi-dimensional variables are evaluated to detect correlations between features such as porosity, permeability, resistivity, and geochemical markers that indicate areas of hydrocarbon accumulation. This predictive capability enables better regional resource assessment decisions and optimization of hydrocarbon exploration programs.

An implementation described in this specification provides a method of drilling a hydrocarbon production well in a subsurface formation. The method includes training a convolutional neural network (CNN) using a set of training data including information of gas exsolution in an oil reservoir, a seismic indicator, a chemical indicator, and a petrophysical indicator. The method further includes providing an input image including a seismic cross-section of a subsurface formation to the CNN, where the subsurface formation includes an uplifted region or a faulted region. The method further includes providing chemical information of hydrocarbons present in a location within the subsurface formation, where the chemical information is obtained from a fluid sample collected from the location. The method further includes providing petrophysical information at the location. The method further includes computing a probability of gas exsolution using the CNN based on the seismic cross-section, the chemical information, and the petrophysical information. The method further includes, based on the probability, identifying locations of structural traps where hydrocarbons accumulate in the subsurface formation.

Another implementation described in the specification provides an apparatus including a non-transitory, computer readable, storage medium that stores instructions that, when executed by at least one processor, cause the at least one processor to perform operations. The operations include training a convolutional neural network (CNN) using a set of training data including information of gas exsolution in an oil reservoir, a seismic indicator, a chemical indicator, and a petrophysical indicator. The operations further include providing an input image including a seismic cross-section of a formation to the CNN, the formation including an uplifted region or a faulted region. The operations further include providing chemical information of hydrocarbons present in a location within the formation, the chemical information obtained from a fluid sample collected from the location. The operations further include providing petrophysical information at the location. The operations further include computing a probability of gas exsolution using the CNN based on the seismic cross-section, the chemical information, and the petrophysical information. The operations further include, based on the probability, generating or update a hydrocarbon production plan for the formation.

Another implementation described in the specification provides a system including: one or more memory modules; one or more hardware processors communicably coupled to the one or more memory modules; and the one or more hardware processors configured to execute instructions stored on the one or more memory modules to perform operations. The operations include training a convolutional neural network (CNN) using a set of training data including information of gas exsolution in an oil reservoir, a seismic indicator, a chemical indicator, and a petrophysical indicator. The operations further include providing an input image including a seismic cross-section of a formation to the CNN, the formation including an uplifted region or a faulted region. The operations further include providing chemical information of hydrocarbons present in a location within the formation, the chemical information obtained from a fluid sample collected from the location. The operations further include providing petrophysical information at the location. The operations further include computing a probability of gas exsolution using the CNN based on the seismic cross-section, the chemical information, and the petrophysical information. The operations further include, based on the probability, generating or updating a hydrocarbon production plan for the formation.

In an aspect, the operations further include obtaining the chemical information by analyzing the fluid sample with a gas chromatography (GC) to obtain the chemical information. The operations further include obtaining the petrophysical information by performing measurements of X-ray diffraction (XRD) patterns, porosity, or permeability.

In an aspect, combinable with any other aspect, computing the probability of gas exsolution using the CNN includes assigning an uplift index or a faulted index to the location based on the seismic cross-section.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

FIG. 3A shows geochemical analysis, FIG. 3B shows structural components analysis, and FIG. 3C shows petrophysical analysis.

FIG. 4A shows a well log including reservoirs A and B, FIG. 4B shows a gas chromatograph (GC) of a fluid sample taken from reservoir A, and FIG. 4C shows a GC of a fluid sample taken from reservoir B.

Like reference symbols in the various drawings indicate like elements.

DETAILED DESCRIPTION

This specification describes methods for locating hydrocarbons by characterizing gas exsolution from oil. Geochemical and petrophysical methods are integrated with machine learning with CNNs. Based on geochemical analysis, petrophysical measurements, and AI models, the presence of exsolved gas in oil reservoirs situated in uplifted and faulted geological formations is predicted. This predictive capability enables better regional resource assessment decisions and optimization of hydrocarbon exploration programs.

Figure 1:
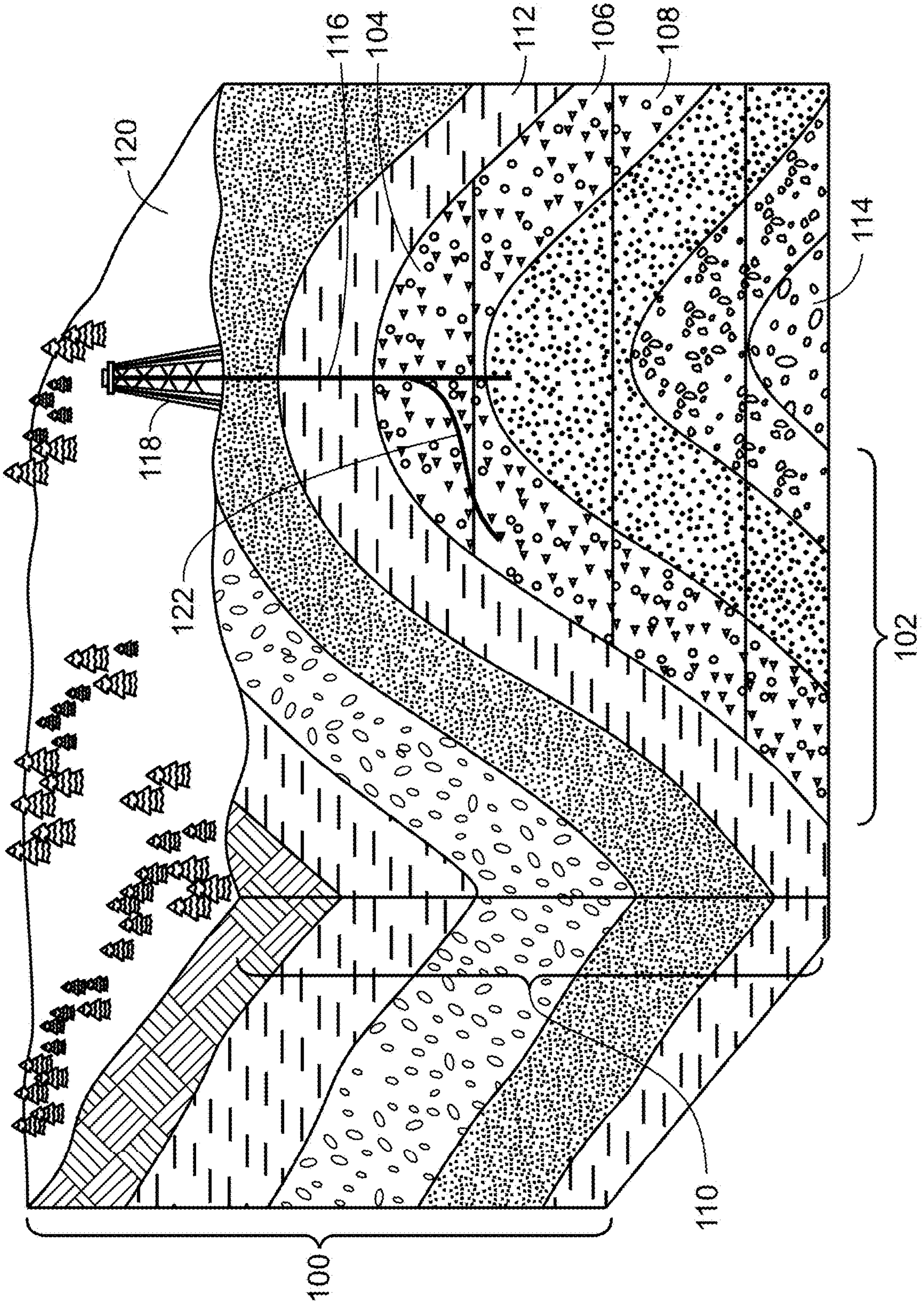
FIG. 1 shows a schematic representation of a subterranean region of interest.

FIG. 1 depicts a schematic representation of a subterranean region of interest 100, lying beneath a portion of the surface 120 of the Earth. In various implementations, the presence of gas exsolution in the formation can be evaluated using the method described in this specification in the subterranean region of interest 100. The predicted probability of gas exsolution can be further used when identifying a zone in the subterranean region of interest 100 to drill a hydrocarbon production well.

As illustrated in FIG. 1, the surface 120 of the Earth can be a land area, or a swamp, lacustrine or marine area, or any combination of these areas. The subterranean region of interest 100 can include one or more hydrocarbon reservoirs, such as a hydrocarbon reservoir 102, lying beneath an overburden 110.

Typically, the overburden 110 includes rocks lying above a hydrocarbon reservoir, such as the hydrocarbon reservoir 102. The overburden is of lesser interest to those exploring for, or producing, hydrocarbons from the hydrocarbon reservoir 102. The overburden 110 can include, for example, a cap rock 112, or seal. Typically, the cap rock 112 forms an impermeable layer above the hydrocarbon reservoir 102 through which hydrocarbons cannot flow. Below the hydrocarbon reservoir 102 lie further rock layers, sometimes called an underburden 114 or basement. In some cases, the underburden 114 may contain the source rock from which the hydrocarbon has been produced from biological material under the combined effect of heat and pressure over geological time periods.

In some cases, the subterranean region of interest 100 contains two or more hydrocarbon reservoirs disposed at different depths. In such cases a shallow hydrocarbon reservoir can form part of the overburden 110 for a deeper hydrocarbon reservoir. The hydrocarbon reservoir 102 can itself be subdivided into different layers or formations. Hydrocarbon reservoirs are typically associated with sedimentary rock formations, which can consist of multiple layers deposited over geological time. These layers, or formations, can vary in their properties such as porosity, permeability, and fluid content. In the example of FIG. 1, the shallowest layer within the hydrocarbon reservoir 102 may predominantly contain gas with the pores of the rock and be referred to as a gas leg 104. In addition, as illustrated in FIG. 1, below the gas leg 104 can lie an oil leg 106 where the pores are predominantly filled with oil.

Typically, the lowest level of the reservoir forms a water leg 108 where the pores are predominantly filled with water or brine. This ordering, with a gas leg 104 lying above an oil leg 106, lying in turn above a water leg 108, is controlled by the relative buoyancy of gas, oil and water and the gradual flow or movement of the three fluids through the pores of the rock over geological time. Although, all three layers can be present in some hydrocarbon reservoirs, other may contain only two, for example oil and water.

Figure 2:
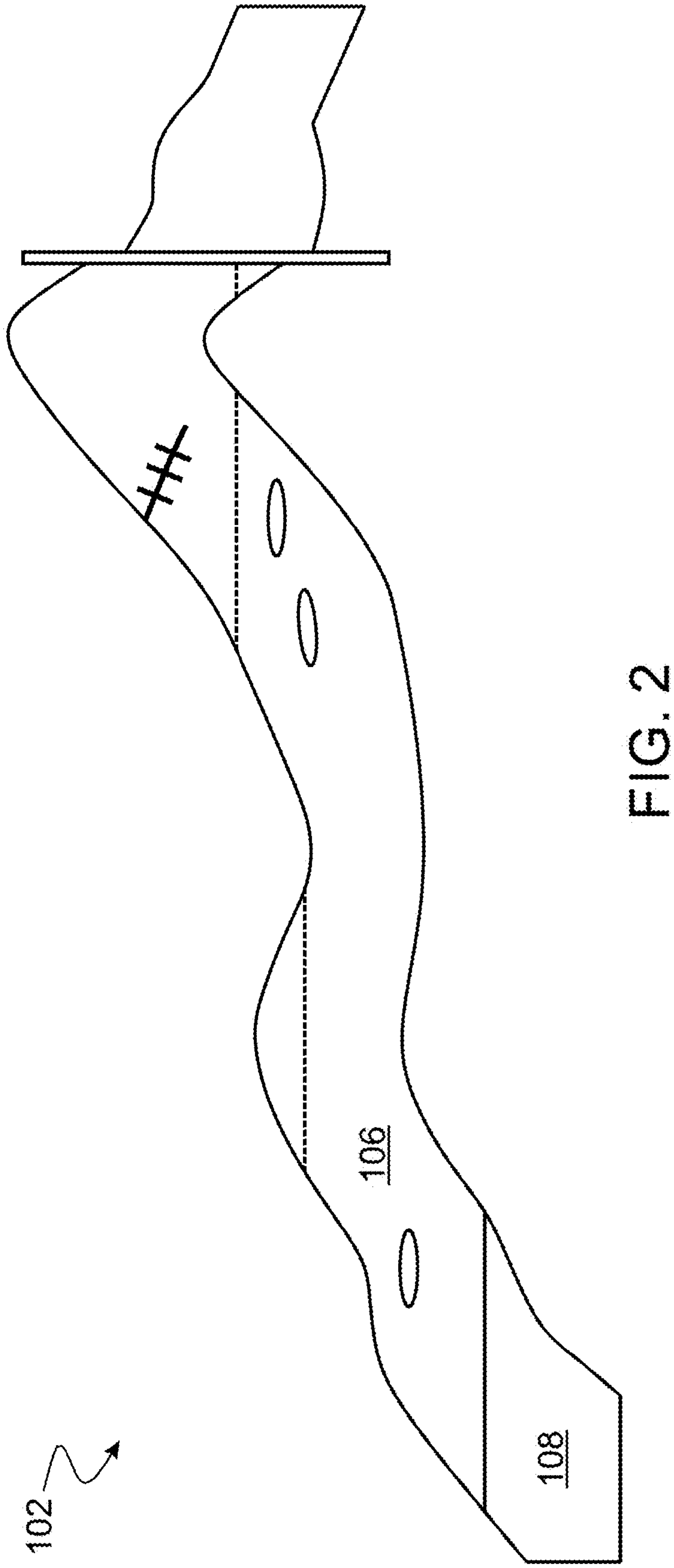
FIG. 2 shows a schematic representation of gas exsolution in uplifted and faulted blocks in a formation.

FIG. 2 shows a schematic representation of gas exsolution in uplifted and faulted blocks in a formation. In FIG. 2, gas exsolution is illustrated above an oil leg 106 in a portion of the hydrocarbon reservoir 102. Exsolved gas refers to gas that has separated from solution, e.g., oils, due to pressure reduction associated with tectonic uplift or faulting or other mechanisms. In some cases, this dynamic process can enhance reservoir quality by increasing porosity and driving secondary migration of hydrocarbons. Understanding the behavior of exsolved gas in oil reservoirs, particularly in uplifted and faulted blocks, can help improving production strategies and maximizing resource assessment.

In some embodiments, a presence of gas exsolution is used to determine the location of hydrocarbons in the subsurface, such as oil, gas, and water. In examples, uplifted blocks bounded by faults can form structural traps where hydrocarbons accumulate. The traps are often prime targets for drilling, and in the example of FIG. 2, the structural trap is shown with a producer well drilled into the trap. In examples, faults can segment reservoirs and create isolated components, such as the oil leg 106 and water leg 108. As shown in the example of FIG. 2, faults can segment reservoirs. In examples, fluid flow and recovery strategies are modified in response to reservoir compartmentalization.

Traditional methods for predicting exsolved gas rely on simplified models and empirical correlations, leading to uncertainties in reservoir characterization. There is a growing need for integrated approaches that leverage geochemical and petrophysical data and artificial intelligence techniques to improve the accuracy and reliability of exsolved gas prediction. In various implementations, the method evaluates possible gas exsolution from oil using the combination of geochemical analysis, petrophysical analysis, and machine learning with CNNs.

Referring back to FIG. 1, in various implementations, producing hydrocarbon from a hydrocarbon reservoir requires the drilling of a wellbore using a drilling system 118. The wellbore can be drilled directly from the surface 120 of the Earth 120 to the hydrocarbon reservoir 102. Such a wellbore, drilled from the surface to the reservoir, can be called a primary wellbore 116. In some implementations, additional wellbores can be drilled from a primary wellbore. Such a wellbore may be termed a lateral extension 122 or simply lateral, or a sidetrack. The lateral extension 122 can be initiated from the primary wellbore 116 hundreds or thousands of meters thousands of feet below the surface 120 of the Earth 120. More than one lateral extension, such as lateral extension 122, can originate from the same primary wellbore 116. In various implementations, the result of gas exsolution prediction can be used in identifying a zone of interest in the subsurface formation to drill a wellbore (primary wellbore 116 and/or lateral extension 122).

In various implementations, AI models, including machine learning and neural networks, are employed to analyze the complex multidimensional relationships within the geochemical and petrophysical data. By training the model on datasets of known reservoir conditions and exsolved gas behavior, the predictive model can capture subtle patterns and variations in the input data, enabling a prediction of gas exsolution with high accuracy.

In some implementations, CNNs can be used for the machine learning. A CNN model is trained using data indicative of gas exsolution and the trained model can be used to calculate a probability of gas exsolution at various locations in a formation based on the set of input data in various applications. The training data is based on actual field data collected from one or more wells. The training data can include geochemical, petrophysical, and seismic information that can be correlated to the diagnostic of exsolved gas. Accordingly, in some implementations, a set of training data includes information of gas exsolution in an oil reservoir, a seismic indicator, a chemical indicator, and a petrophysical indicator. Here, an indicator refers to any parameter that represents the characteristic of the oil reservoir. An indicator can represent seismic information, chemical information, or petrophysical information of the oil reservoir used in the training data set. For example, one or more values can be assigned to the indicator to represent the degree of reservoir saturation, porosity, hydrocarbon composition, and mineralogical composition.

The training process begins with obtaining and preparing training data. For example, a set of fluid samples is captured from one or more wells and analyzed for its chemical compositions for geochemical fingerprinting. In various implementations, gas chromatography (GC) can be used to obtain the chemical information of the fluid samples. Further, petrophysical analysis can be performed for the areas of interest. The petrophysical information includes but is not limited to porosity, permeability, mobility, fluid saturation, pressure, and mineralogical composition. In some implementations, the mineralogical composition includes relative concentrations of Kaolinite, Mixed Illite-Mica, Orthoclase, Plagioclase, and Quartz. The seismic information can include seismic cross-sections indicative of uplifted and faulted blocks. The captured training data can then undergo preprocessing, which can include normalization, resizing, and splitting into training and testing sets to ensure consistency and performance.

Once the training data sets are preprocessed, the CNN architecture is designed, incorporating convolutional layers for feature extraction, pooling layers for dimensionality reduction, and fully connected layers for classification. During training, the model learns by adjusting weights to minimize loss, using the training data. Once trained, the model is evaluated using the test set to assess its accuracy and generalization capability. In the following, the method of predicting gas exsolution using the trained CNN model is descried referring to FIGS. 3A-12.

Figure 3A:
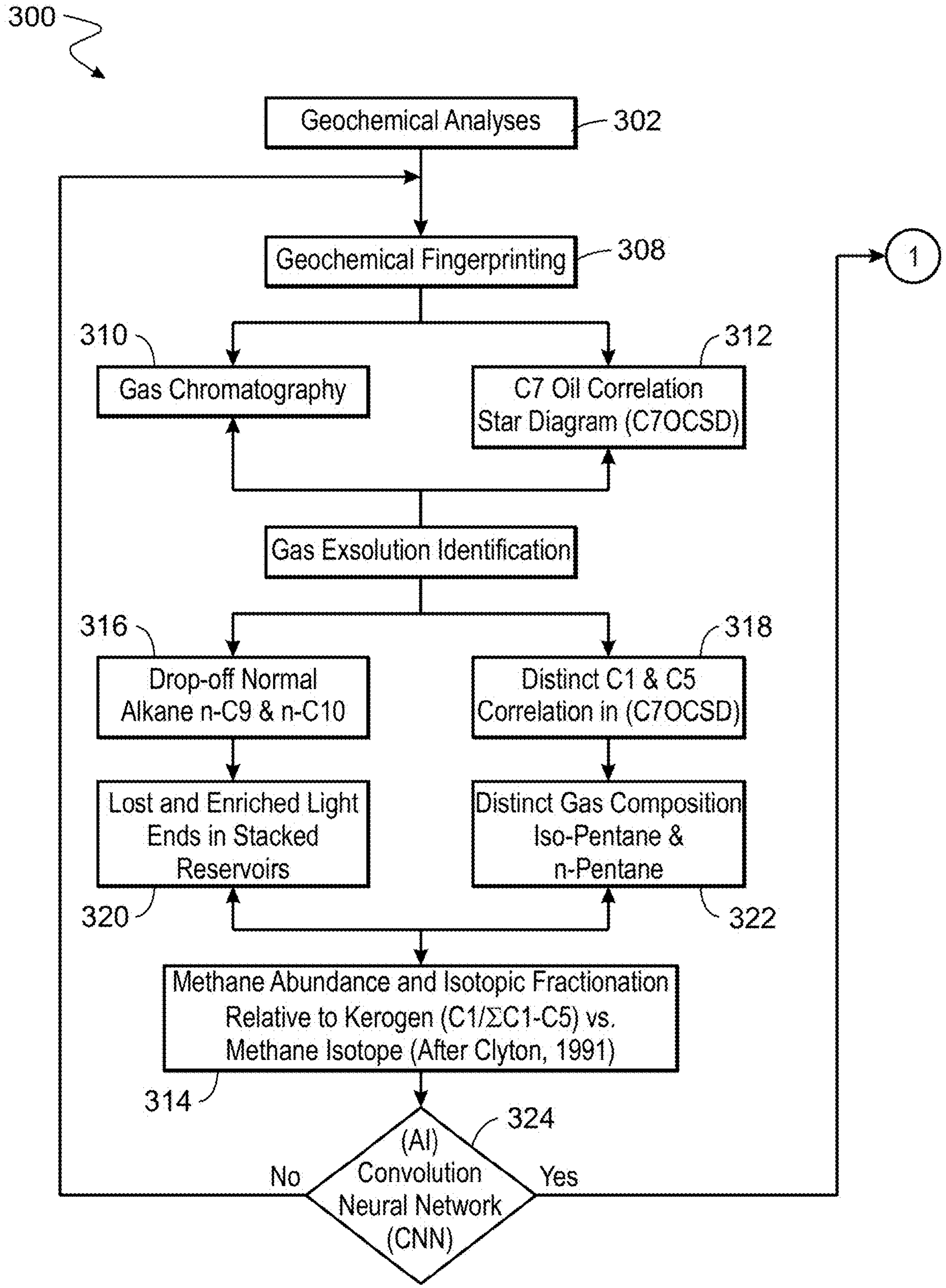
FIGS. 3A-3C shows a process flow chart illustrating a method of gas exsolution prediction with three stages, where
Figure 3B:
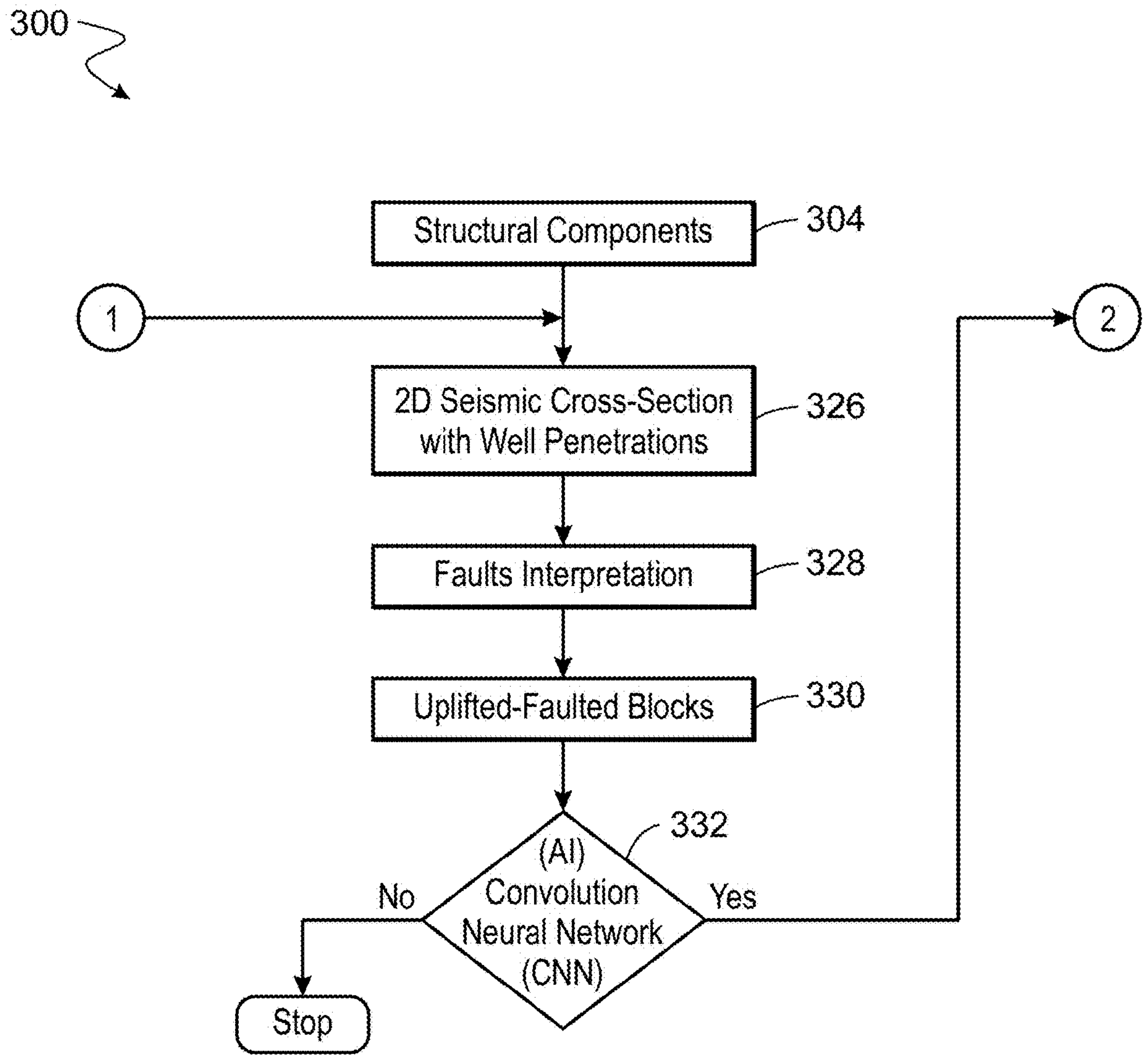
Figure 3C:
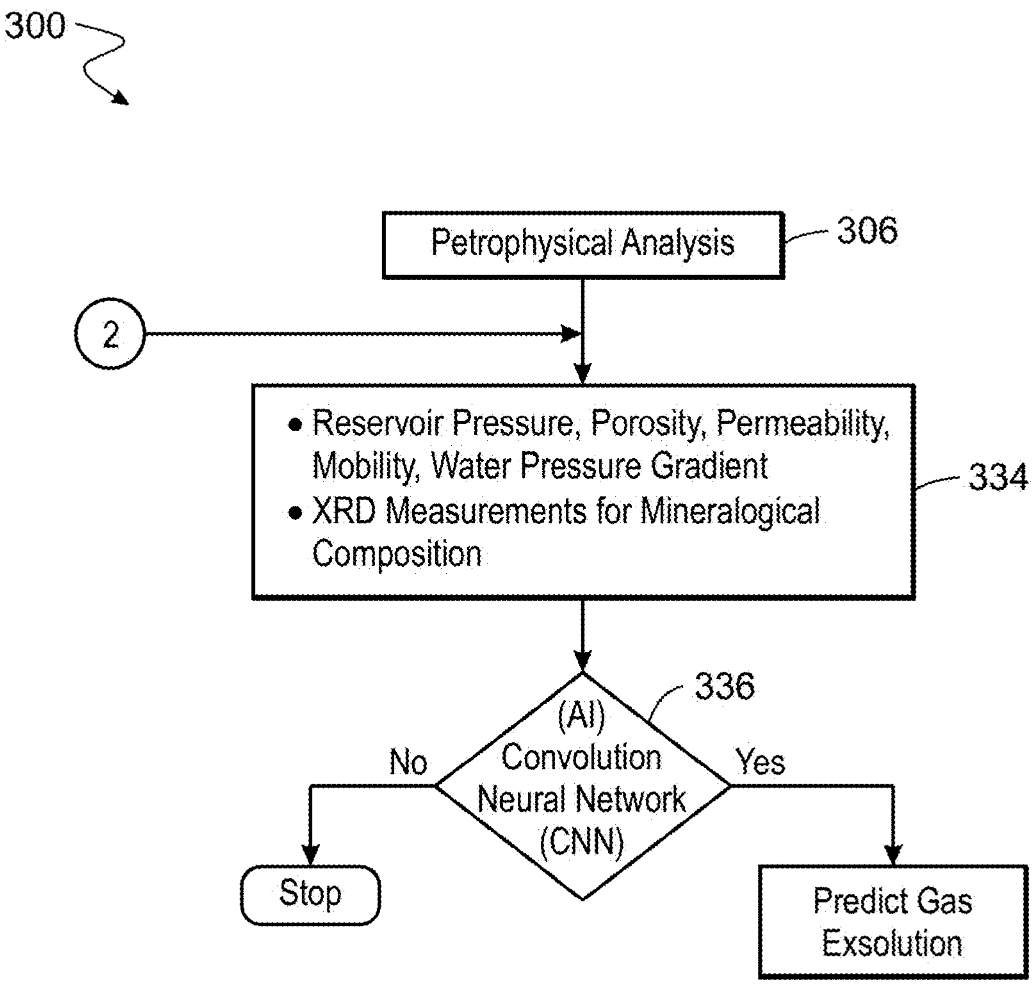

FIGS. 3A-3C show a process flow chart illustrating a method of gas exsolution prediction. In various implementations, the prediction with the trained CNN model includes three analytical stages of determining the presence of gas exsolution. For example, the method can follow the order of geochemical analysis (302 in FIG. 3A), structural components analysis (304 in FIG. 3B), and petrophysical analysis (306 in FIG. 3C). At each stage, the CNN model can determine whether gas exsolution is present or not, and accordingly determine if the method should proceed to the subsequent analytical stage.

In FIG. 3A, a process 300 begins with collecting and analyzing fluid samples for geochemical information. In various implementations, the geochemical information can include hydrocarbon fingerprinting (308) obtained from GC analysis of the fluid samples (310). In some implementations, further data analysis of chemical composition can be performed, for example, through C7 oil correlation star diagram (C7OCSD) (312) and analysis of isotopic ratios in a Clayton plot (314). Other geochemical analysis can include but is not limited to drop-off of normal alkane (316), C1 and C5 correlation (318), lost and enriched light ends in stacked reservoirs (320), and distinct gas composition of iso-pentane and n-pentane (322). Examples of geochemical analysis are further described below referring to FIGS. 4A-4C and 5-7.

Subsequently, as illustrated in FIG. 3B, the process 300 can proceed to analysis of structural components (304). In some implementations, the process 300 proceeds to this second stage if the initial assessment by the CNN model suggests the presence of gas exsolution based on the geochemical information (324). If the initial assessment suggests the absence of gas exsolution, the process 300 can return to the geochemical fingerprinting (308). In various implementations, the two-dimensional (2D) seismic cross-section of a formation of interest (326) can be obtained and provided to the trained CNN model to evaluate the uplifting and fault in the formation, e.g., faut interpretation (328) followed by uplifted-faulted blocks evaluation (330). Since uplifted and faulted blocks in the formation can cause changes in pressure and stress regimes in the reservoirs, evaluating the degree of uplifting and fault can be used as a factor in predicting the gas exsolution. In some implementations, the analysis can end at this stage if the CNN model suggests the absence of gas exsolution (332). The process 300 can proceed to the next analytical stage if the CNN model suggests the presence of gas exsolution. Examples of structural component analysis are further described below referring to FIGS. 8A-8B.

After the analysis of structural components, the process 300 can further proceed to petrophysical analysis (306) as illustrated in FIG. 3C. In various implementations, petrophysical measurements (334) can be performed to collect data such as reservoir pressure, porosity, permeability, mobility, and water pressure gradient. In some implementations, the data includes the mineralogical composition such as relative concentrations of Kaolinite, Mixed Illite-Mica, Orthoclase, and Plagioclase. A quartz content can also be used as a part of the mineralogical composition. In various implementations, X-ray diffraction (XRD) measurements are performed to obtain at least a portion of the petrophysical information. Examples of petrophysical analysis are further described below referring to FIGS. 9-12. The final assessment by the CNN model (336) can be performed based on the petrophysical analysis.

Using the outputs of the geochemical analysis, structural component analysis, and petrophysical analysis, gas exsolution is predicted. Based on the predicted gas exsolution, locations of hydrocarbons within the subsurface are determined. In examples, directional drilling can be implemented in faulted zones to obtain access to desired hydrocarbons. Additionally, reinforced casings can be installed to address instability in faulted zones. Well placement and recovery techniques are informed by the hydrocarbon locations. In examples, uplifted and faulted zones are mapped for inclusion the reservoir models. The locations where gas exsolution is likely can correlate with hydrocarbon-bearing formations. Using pattens recognized across multi-variate and multi-dimensional geochemical analysis, structural component analysis, and petrophysical analysis enables the identification of subsurface features undiscovered using traditional determinations of gas exsolution.

Geochemical Analysis

Figure 4A:
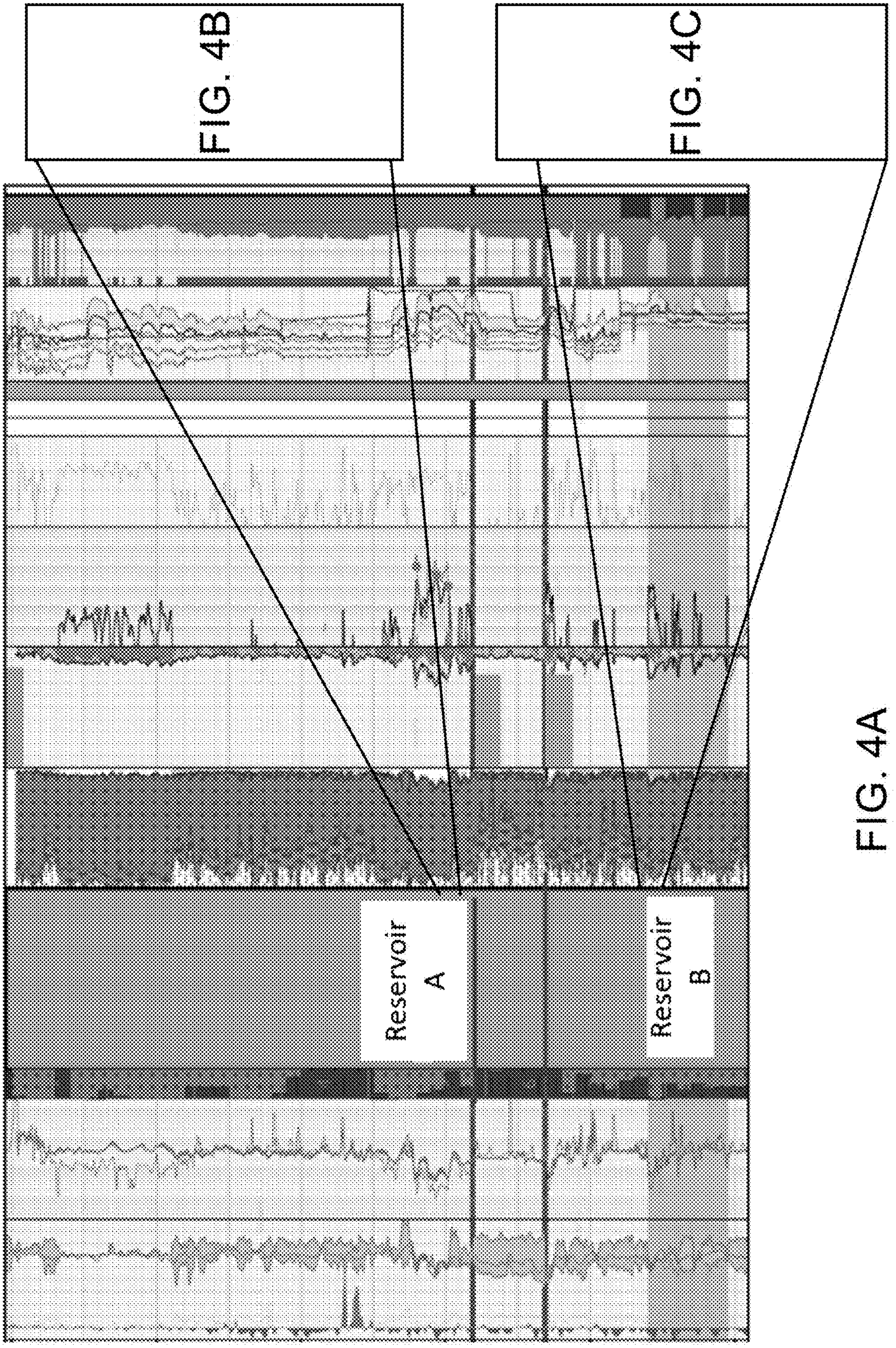
FIGS. 4A-4C show an example of geochemical analysis, where
Figure 4B:
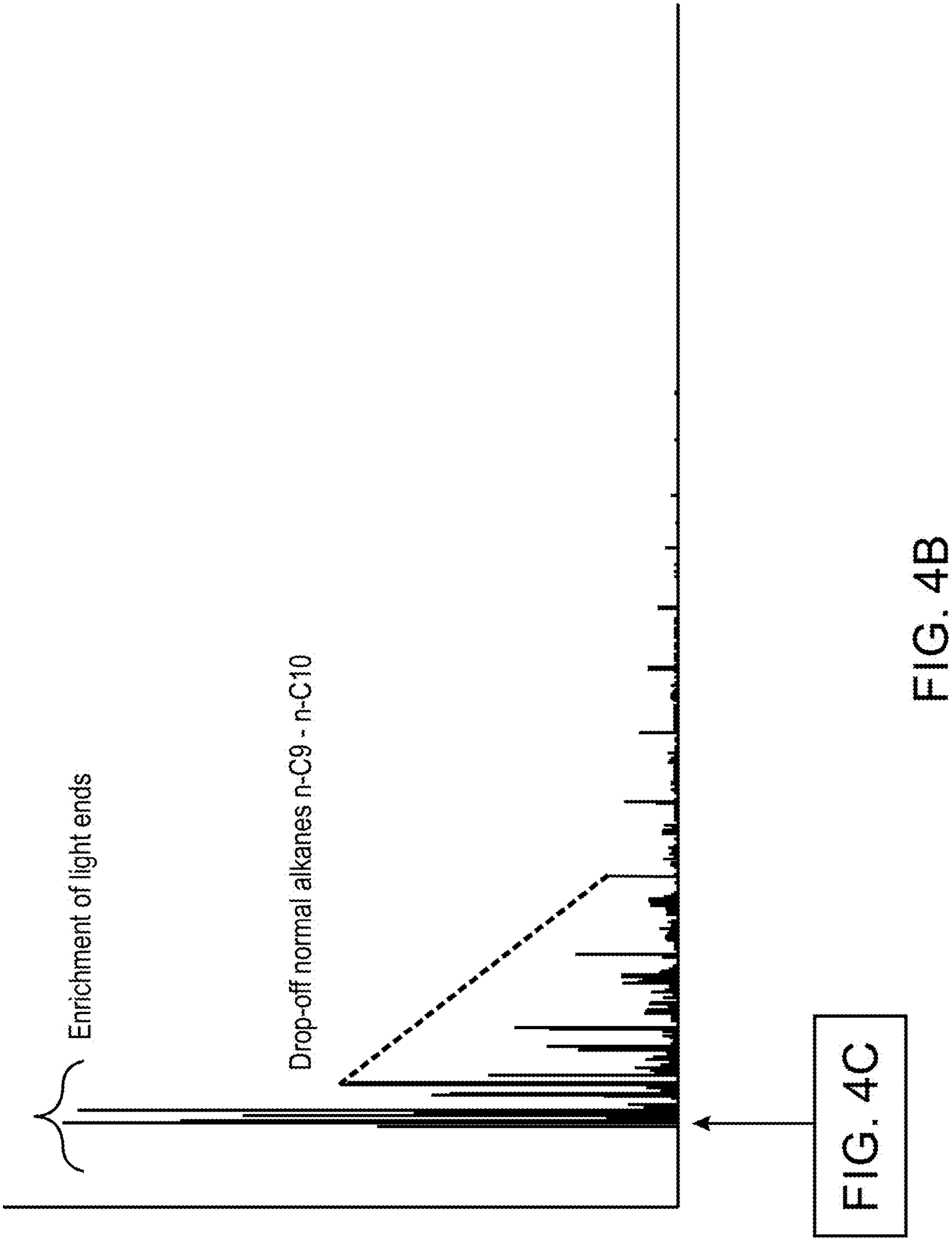
Figure 4C:
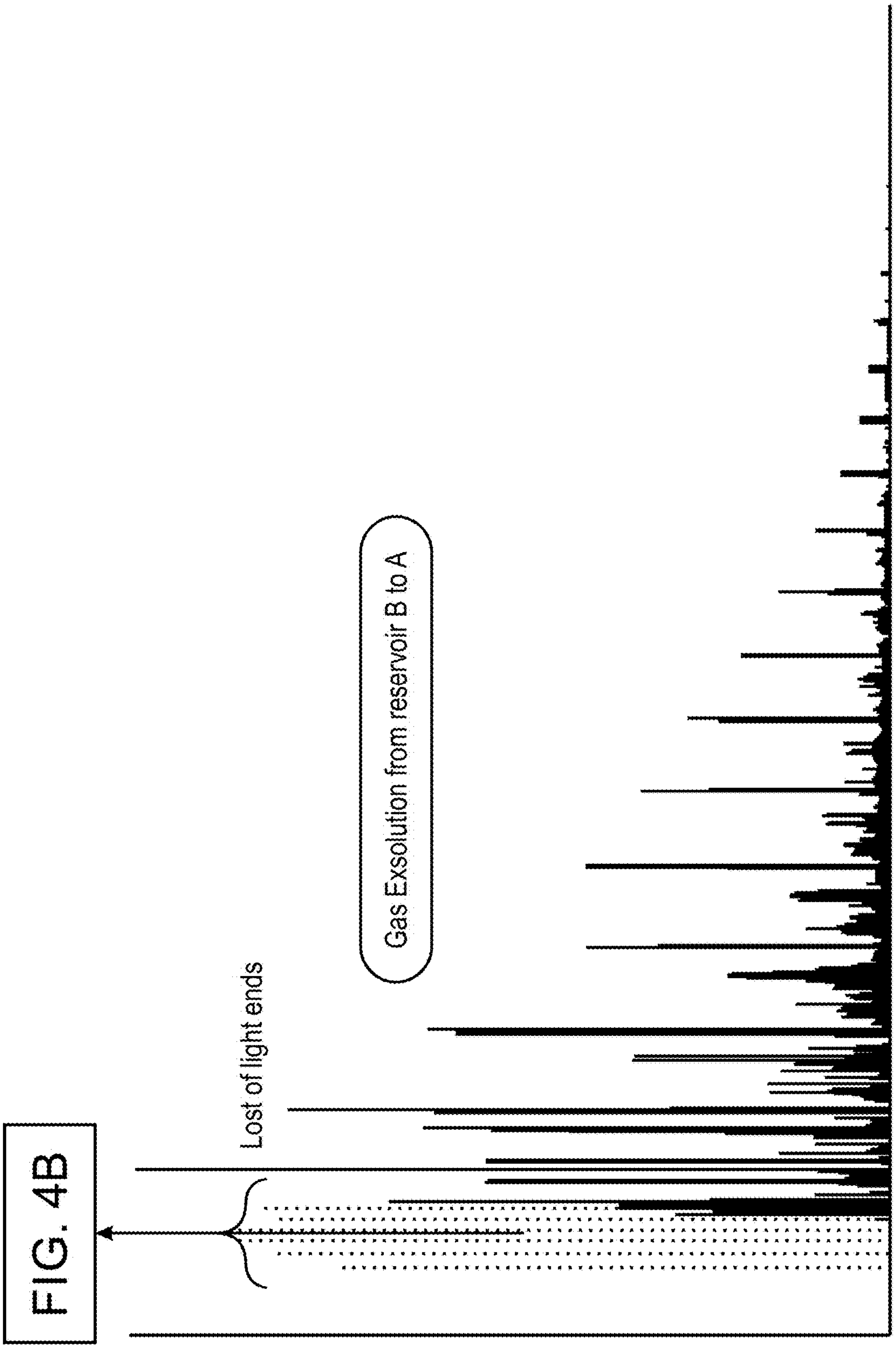

FIG. 4A shows a well log including two regions: reservoirs A and B, FIG. 4B shows a GC of a fluid sample taken from reservoir A, and FIG. 4C shows a GC of a fluid sample taken from reservoir B, in accordance with one or more implementations. The two GCs (FIGS. 4B and 4C) demonstrates distinct chemical compositions of fluids present in the two reservoirs. In various implementations, a GC is analyzed to examine a drop-off in normal alkanes, e.g., nC9 and nC10 species, compared to lighter hydrocarbons, e.g., methane to nC8 species. Accordingly, the chemical information obtained from the geochemical analysis such as GC can include a ratio of a normal alkane, e.g., nC9, to another normal alkane, e.g., methane. A sudden drop in the abundance of nC9 and nC10 in the GC can indicate that these components are stripped out or fractionated during gas exsolution and migration. For example, the drop-off is more prominent in reservoir A (FIG. 4B) compared to reservoir B (FIG. 4C), suggesting the gas exsolution in reservoir A.

In some implementations, the concentrations of light-ends, e.g., ranging from C1 to C5 species, in GC can be compared, where a loss (reduction) in the light-ends can indicate gas exsolution form one region to another. For example, the relative abundance of light-ends in reservoir A (FIG. 4B) compared to reservoir B (FIG. 4C) can suggest gas exsolution from reservoir B to reservoir A.

Further, the GC analysis can also be used to obtain a C7 oil correlation star diagram (C7 OCSD), where the relative ratios of five compounds (C1 to C5 species) based on the C7 concentration are plotted in polar coordinates. Focusing on the five compounds that are resistant to alteration by processes such as biodegradation, evaporation, or water washing, the diagram can be useful for correlating different oil compositions. In some implementations, the variations in the diagram do not stem from changes in the source rock organofacies.

Figure 5:
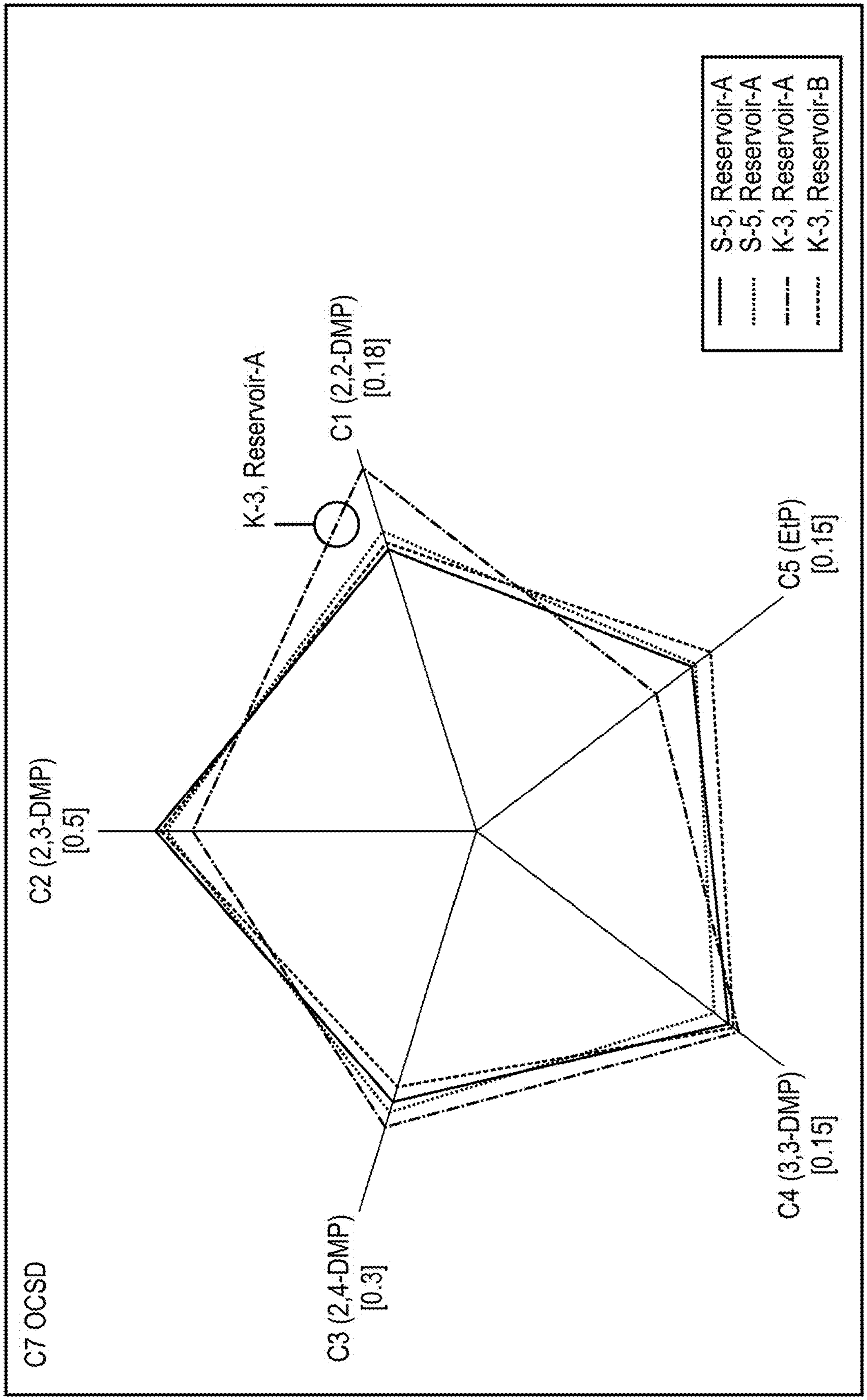
FIG. 5 shows an example C7 oil correlation star diagram (C7 OCSD) for reservoirs A and B.

FIG. 5 shows an example C7 OCSD for reservoirs A and B from two different wells denoted as S-5 and K-3 wells. In FIG. 5, significant differences in oil fingerprinting are observed between reservoir A and reservoir B at well K-3, while the fingerprinting of reservoir A and reservoir B are similar to each other well S-5. This data demonstrates the compositional difference due to the gas exsolution can be present in well K-3.

Figure 6:
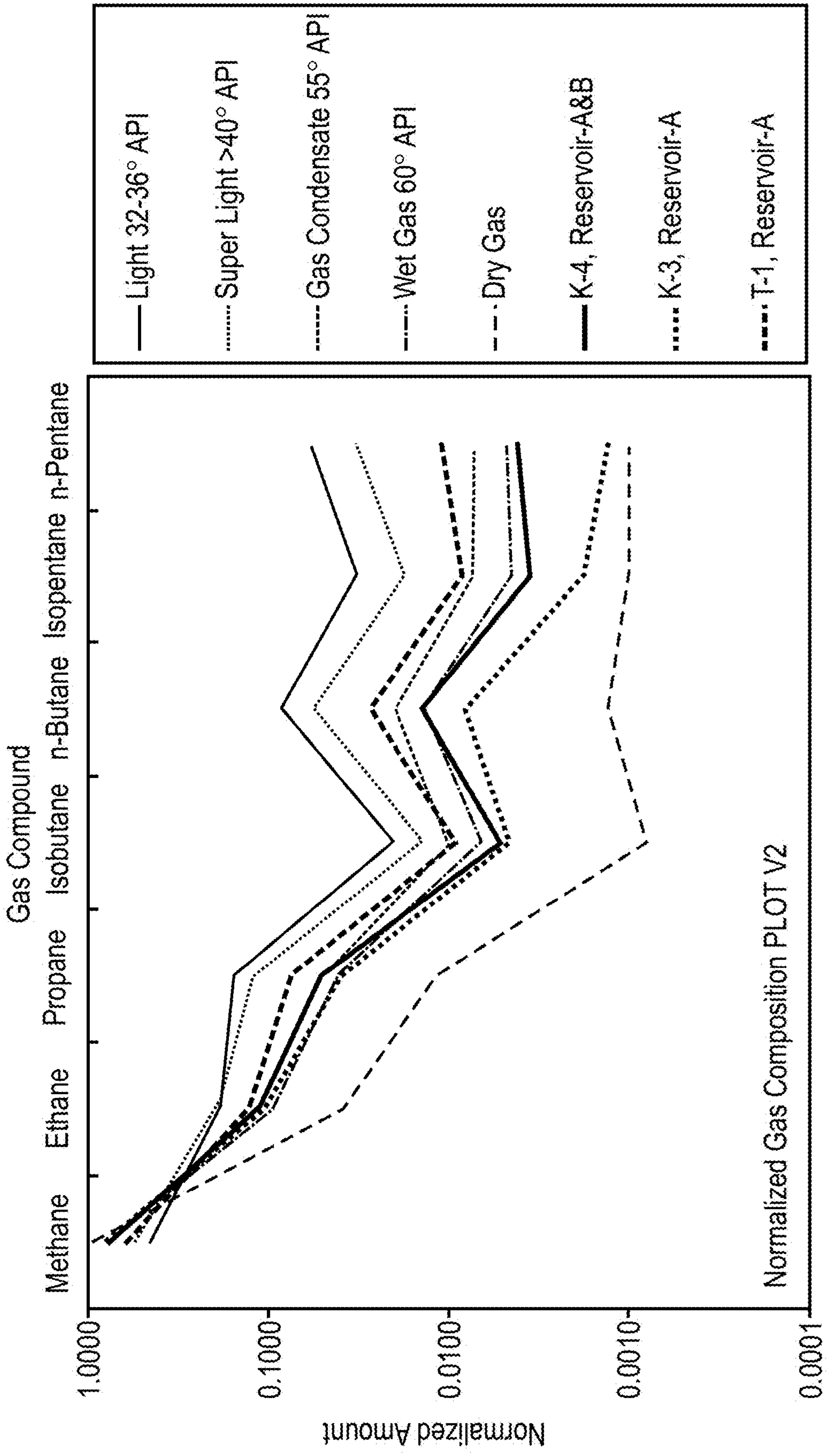
FIG. 6 shows normalized gas compositions at different wells including reservoirs A and B.

In some implementations, the geochemical analysis further includes isomer analysis. For example, the relative abundance of isopentane in reference to n-pentane can be used to evaluate the level of gas exsolution and characterize the reservoir condition. FIG. 6 shows normalized gas compositions at different wells including reservoirs A and B. In FIG. 6, isopentane is less than n-pentane in reservoir A at well K-3, while all the other samples, including reservoir A at different wells, contains more n-pentane than isopentane.

Figure 7:
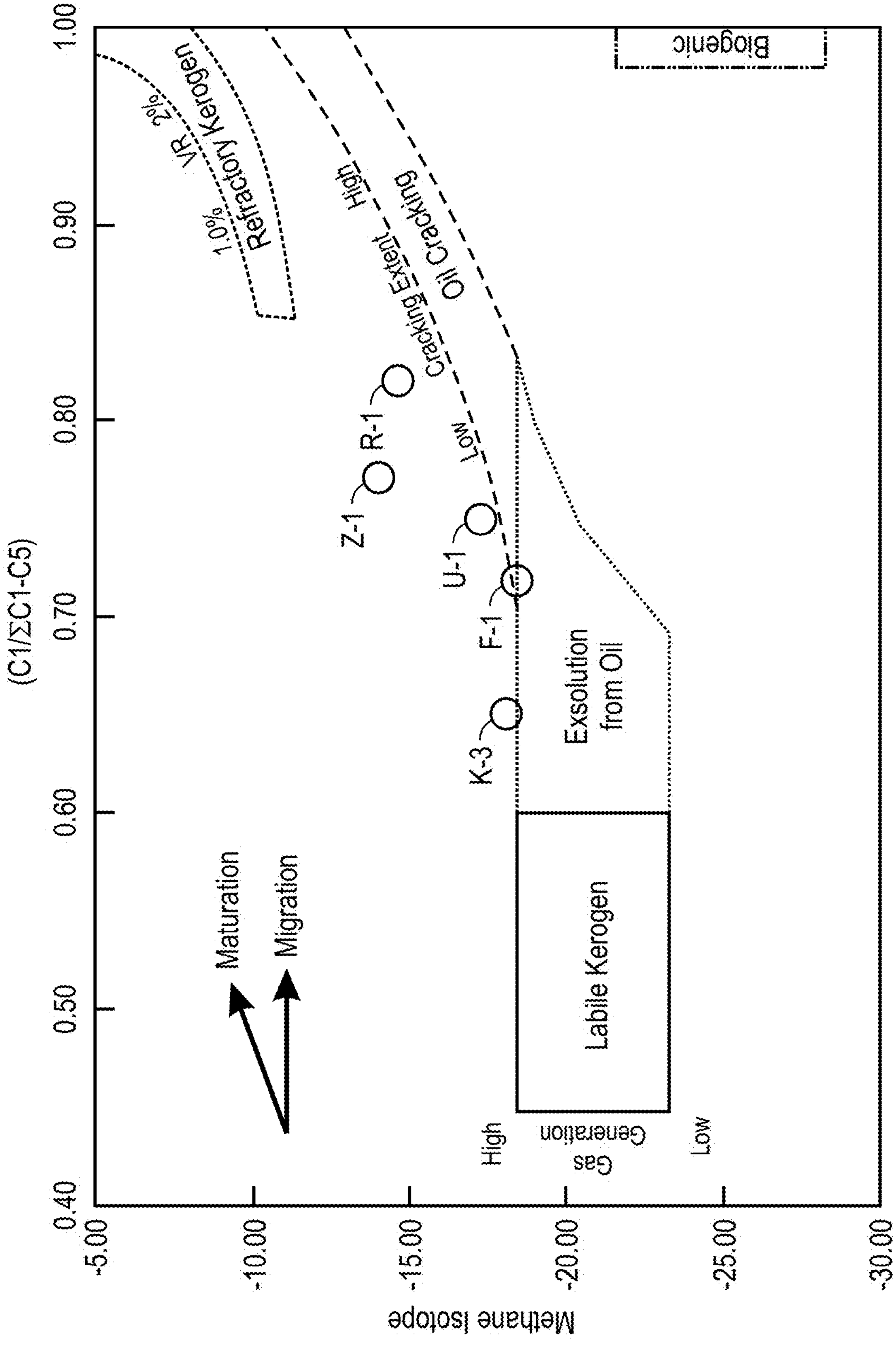
FIG. 7 shows Clayton plot for different wells.

In some implementations, the geochemical analysis further includes methane isotope analysis. For example, such an analysis can be performed using a Clayton plot, as illustrated in FIG. 7. In FIG. 7, the methane isotope abundance is plotted against gas dryness, i.e., a measure of the relative abundance of lighter hydrocarbons, e.g., C1, compared to heavier hydrocarbons, e.g., total of C1-C5. The data point for well K-3 is found in the proximity of a gas exsolution zone in the plot, demonstrating the high likelihood of gas exsolution in this well.

Structural Component Analysis

In various implementations, the subsurface can be modeled by transforming the seismic data using 2D visualizations. 2D visualization involves creating cross-sectional views of the subsurface, typically along seismic lines. These cross-sections display the arrangement of rock layers and geological structures, allowing geologists to interpret features such as faults, folds, and stratigraphic boundaries.

Figure 8A:
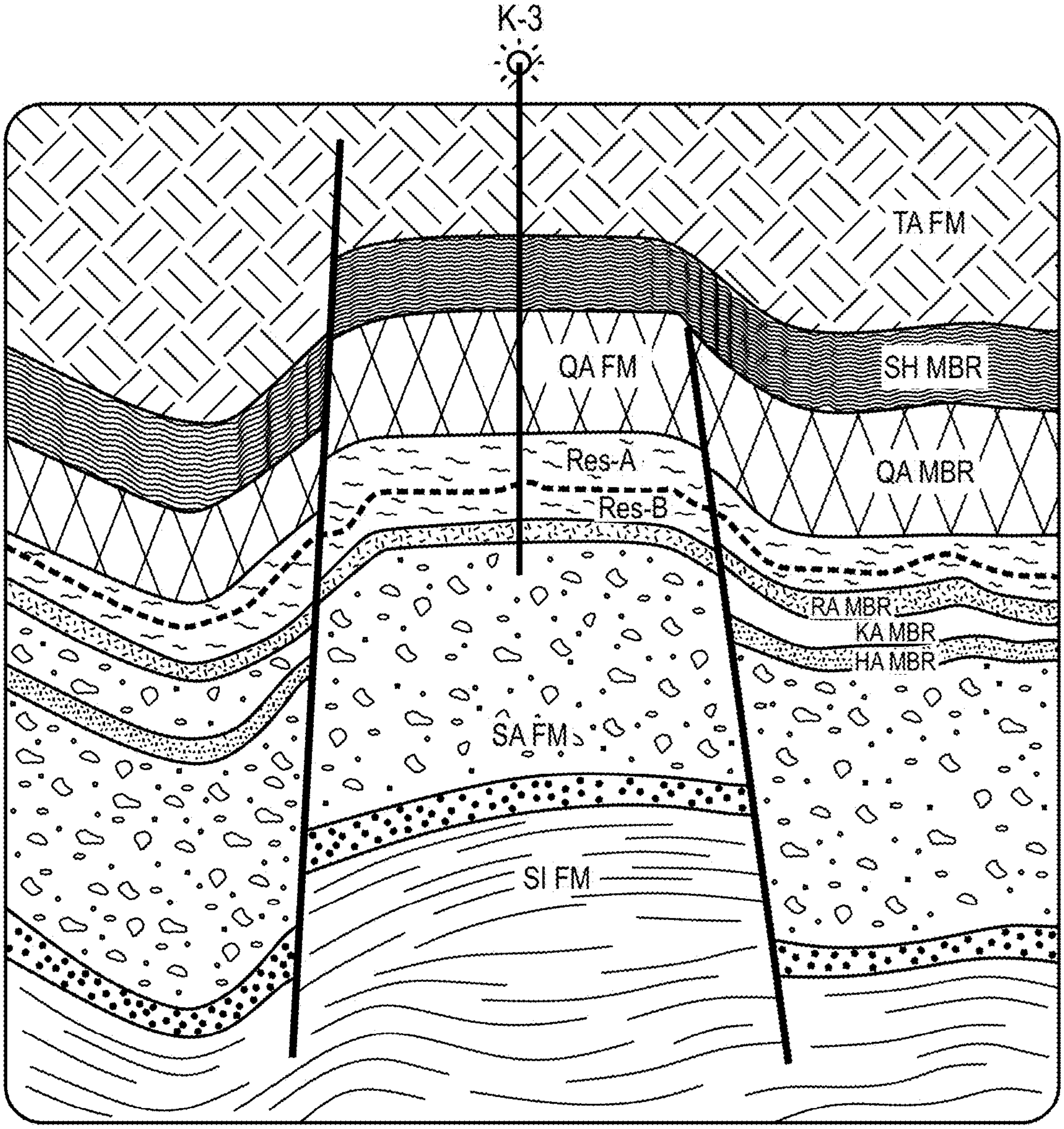
FIG. 8A shows a seismic cross-section of a formation including reservoirs A and B in uplifted and faulted blocks.
Figure 8B:
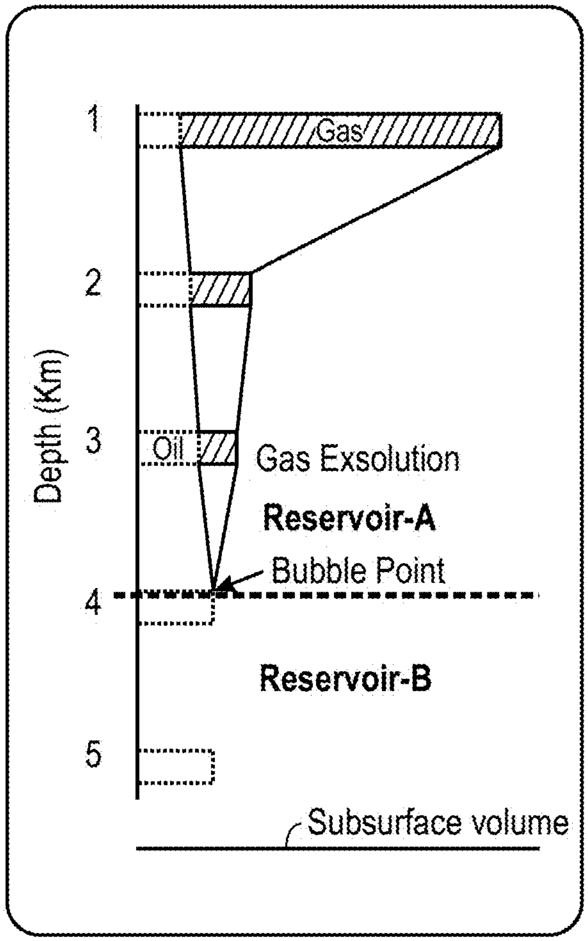
FIG. 8B shows a schematic representation of levels of predicted gas exsolution in reservoirs A and B.

FIG. 8A shows a seismic cross-section of a formation including reservoirs A and B in uplifted and faulted blocks. In FIG. 8A, uplifted and faulted blocks are shown in the middle section, and the well K-3 is drilled in the middle of the uplifted formation. The well K-3 reaches both reservoirs A and B. The trained CNN model can be provided with cross-sections and interpret them to characterize the structural component of the formation. In various implementations, this interpretation process involves assigning a fault intensity, e.g., a value from 0 to 1, and an uplift score, e.g. value from 0 to 1, to a target area of the cross-section. The assigned parameters can then be used as factors in calculating the probability of the gas exsolution in the target area.

Petrophysical Analysis

Figure 9:
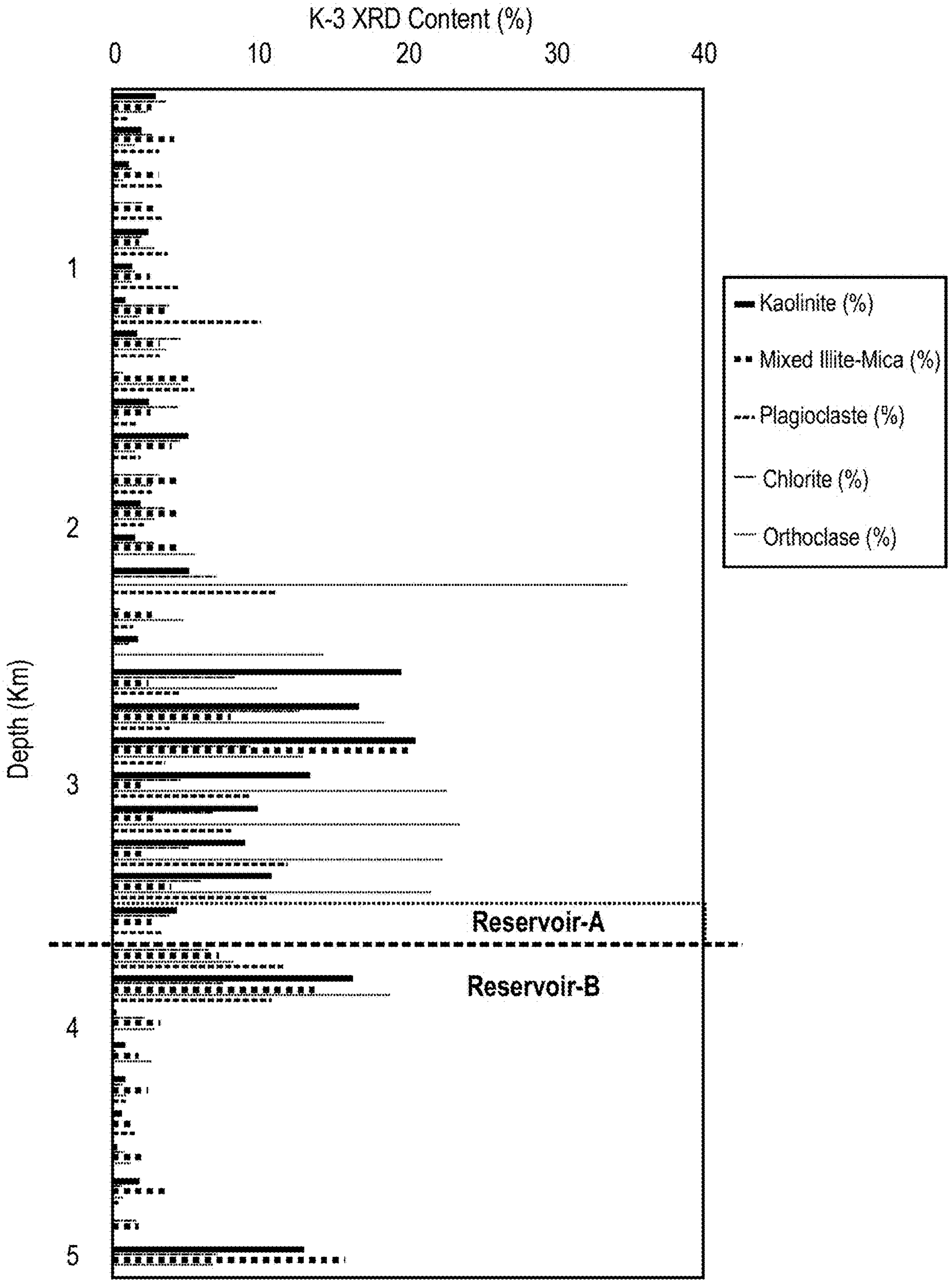
FIG. 9 shows X-ray diffraction (XRD) analysis for a well including reservoirs A and B.

In various implementations, petrophysical analysis involves performing petrophysical measurements such as XRD measurements. FIG. 9 shows XRD analysis for a well including reservoirs A and B. Based on the XRD data, one can estimate mineralogical compositions such as Kaolinite, Mixed Illite-Mica, Orthoclase, Plagioclase, and Quartz. Combined with other physical parameters such as porosity and permeability, these physical parameters can be used as factors in predicting gas exsolution. For example, a deep reservoir, e.g., reservoir B (FIGS. 8A, 8B, and 9), that has more orthoclase content, water production, high pressure, low porosity and permeability, can enhance hydrocarbon adsorption, primarily methane. This indicates that gas exsolution is less likely to occur compared to other formations. On the other hand, a shallow reservoir, e.g., reservoir A (FIGS. 8A, 8B, and 9), that has enhanced porosity, permeability and less orthoclase content, can result in gas exsolution from the oil at low reservoir pressure.

In some implementations, a deep reservoir can have following parameter ranges: Pressure: 2600-2880 psia; Porosity 0.0-0.05; Permeability 0.0-0.1 md; Mobility 0.25-1.5 md/cp. In some implementations, a deep reservoir can have mineralogical compositions: Kaolinite 10-15%; Mixed Illite-Mica>5%; Chlorite>5%; orthoclase 5-10%; plagioclase>5%; Quartz 45-85%.

In some implementations, a shallow reservoir can have following parameter ranges: Pressure: 800-2450 psia; Porosity 0.05-0.075; Permeability 10-100 md; Mobility 10-100 md/cp. In some implementations, a shallow reservoir can have mineralogical compositions: Kaolinite<10%; Mixed Illite-Mica<5%; Chlorite<5%; orthoclase 0%; plagioclase<5%; Quartz 85-95%.

Figure 10:
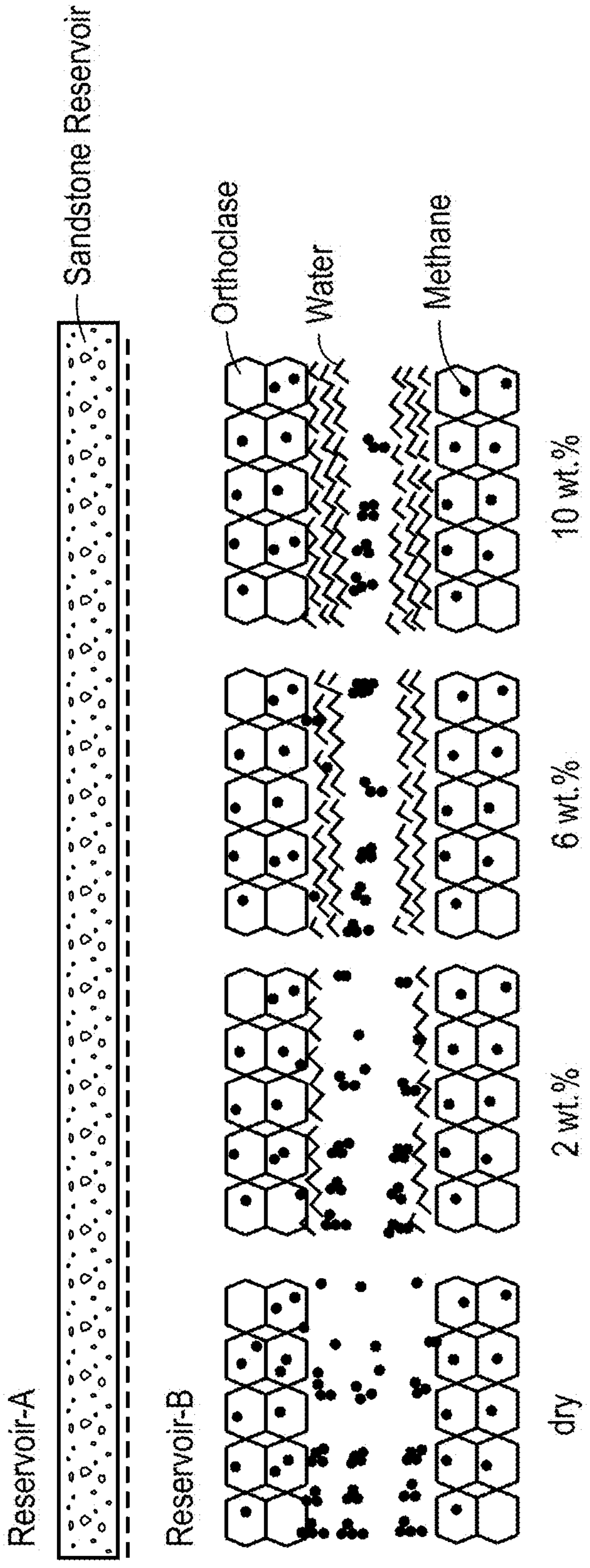
FIG. 10 shows a schematic representation of methane adsorption in reservoirs A and B.

FIG. 10 shows a schematic representation of methane adsorption in reservoirs A and B, where the Orthoclase content in reservoir B has a high preferential adsorption capacity of methane. Further, the adsorption capacity can increase from hydrous Orthoclase slit to dry Orthoclase slit.

Further, based on the petrophysical measurements of collected core plug samples from a well, e.g., well K-3 in FIG. 8A, additional parameters that characterize the reservoir conditions can be calculated. For example, Reservoir Quality Index (RQI), Flow one Indicator (FZI), and Normalized Porosity Index (NPI) can be derived from the collected data and correlated to each other.

RQI is a measure of the ability of a rock to transmit fluids, combining porosity and permeability into a single parameter that reflects reservoir quality, which is defined as:

$$RQI = 0.0314 \times \sqrt{\frac{k}{\phi}}$$

where k is permeability in md and ϕ is porosity. A higher RQI indicates better reservoir quality, meaning the reservoir has more efficiently store and transmit the fluid.

NPI is a dimensionless parameter that normalizes porosity to a scale between 0 and 1, often used to compare porosity across different lithologies or formations. NPI is defined as:

$$NPI = \frac{\phi}{1 - \phi}$$

A higher NPI indicates better storage capacity within the reservoir. Variation in NPI between reservoirs can help identify zones of enhanced porosity that support fluid flow and gas exsolution.

FZI is a rock classification parameter that helps identify hydraulic flow units and zones with similar flow characteristics, which is defined as the ratio of RQI over NPI:

$$FZI = \frac{RQI}{NPI}$$

FZI can be useful in identifying high-flow zone within the reservoir. A higher FZI value indicates enhanced fluid flow.

Figure 11:
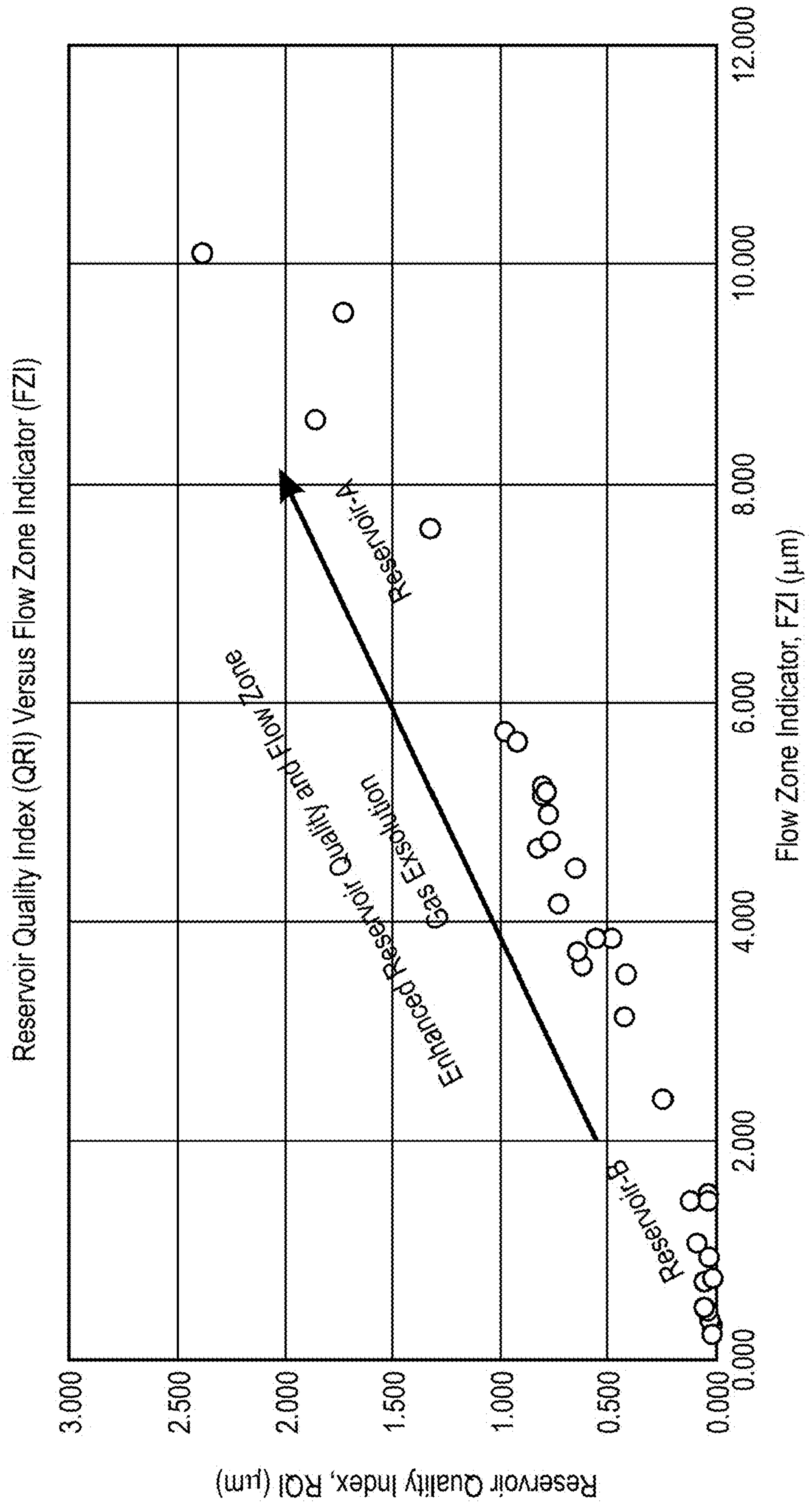
FIG. 11 shows a plot of Reservoir Quality Index (QRI) versus Flow Zone Indicator (FZI)
Figure 12:
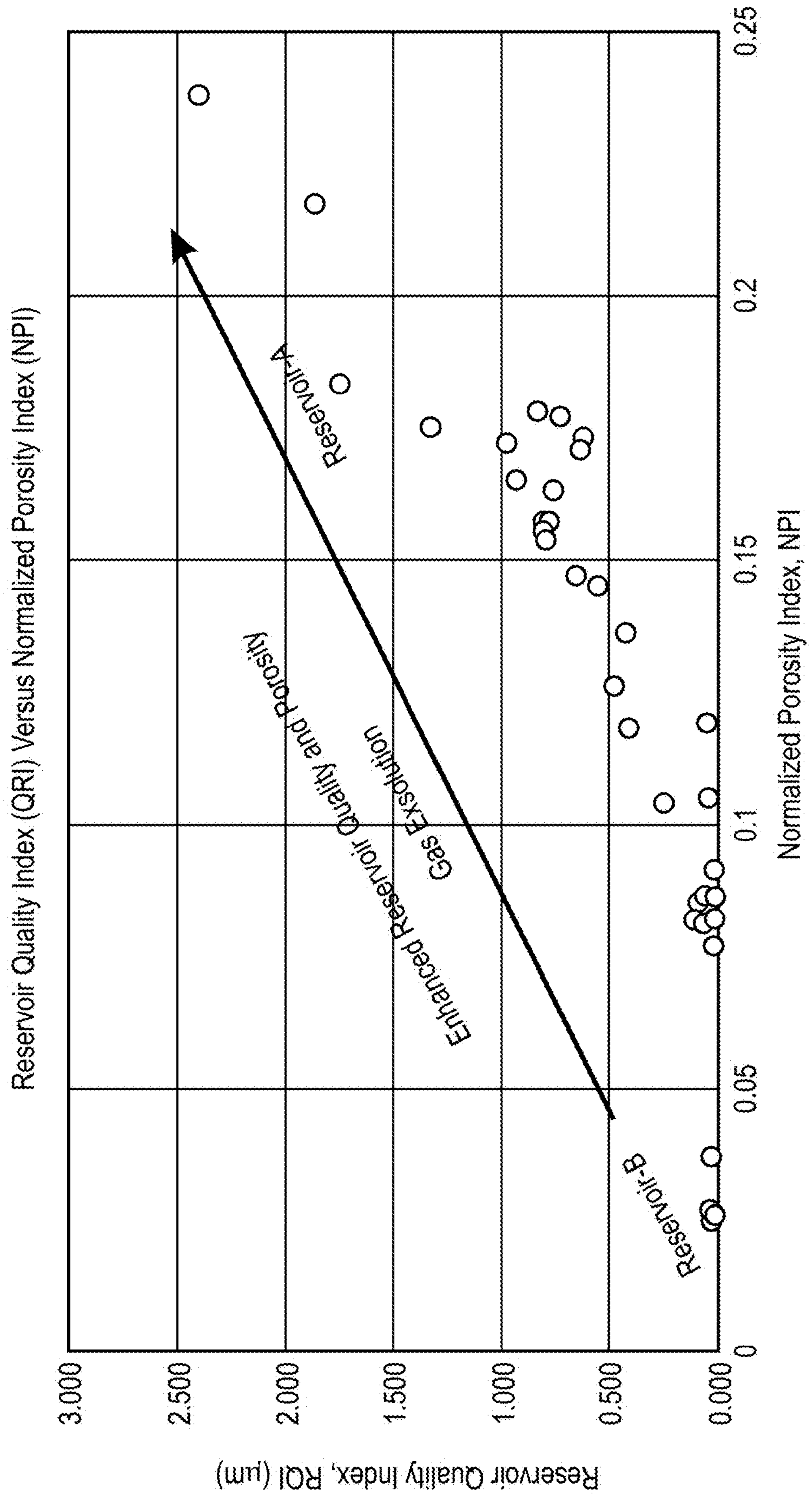
FIG. 12 shows a plot of Reservoir Quality Index (QRI) versus Normalized Porosity Index (NPI).

FIG. 11 shows a plot of QRI versus FZI using the data from the area including reservoirs A and B, and FIG. 12 shows a plot of QRI versus NPI. In FIG. 11, the reservoir quality and flow zone generally improve from reservoir B to reservoir A, which can facilitate the process of gas exsolution. A similar trend of QRI can be also observed in the plot as a function of NPI (FIG. 12).

In various implementations, the input data for the CNN model includes any combinations of the geochemical, structural, and petrophysical information. In some implementations, each type of information includes one or more of the subsets of information, e.g., drop-off in normal alkane and methane isotope data for the geochemical, a cross-section for the structural, and a set of mineralogical compositions for the petrophysical. The trained CNN model can perform the prediction using a set of available data. The CNN model can then output the probability of gas exsolution at one or more areas of interest in the formation. In some implementations, the CNN model can generate a 2D prediction map based on a set of gas exsolution probabilities, where the prediction map the represents a spatial distribution of the probabilities.

As described above, in various implementations, the method for predicting gas exsolution integrates geochemical analysis, structural components, and petrophysical measurements with machine learning using CNNs to predict exsolved gas in uplifted and faulted blocks. By training the model on datasets encompassing known reservoir conditions and the behavior of exsolved gas, the predictive CNN model can discern subtle patterns and variations in the data, enhancing the reliability of prediction. Compared with the traditional methods with simplified models and empirical correlations, the methods in this specification can function as a standalone screening method to improve regional resource assessment to discover more hydrocarbons in the formation of interest. The integration with the CNN model in the method can also reduce the uncertainties in geochemical analyses, especially in hydrocarbon fingerprinting.

Computer Hardware Boilerplate

Figure 13:
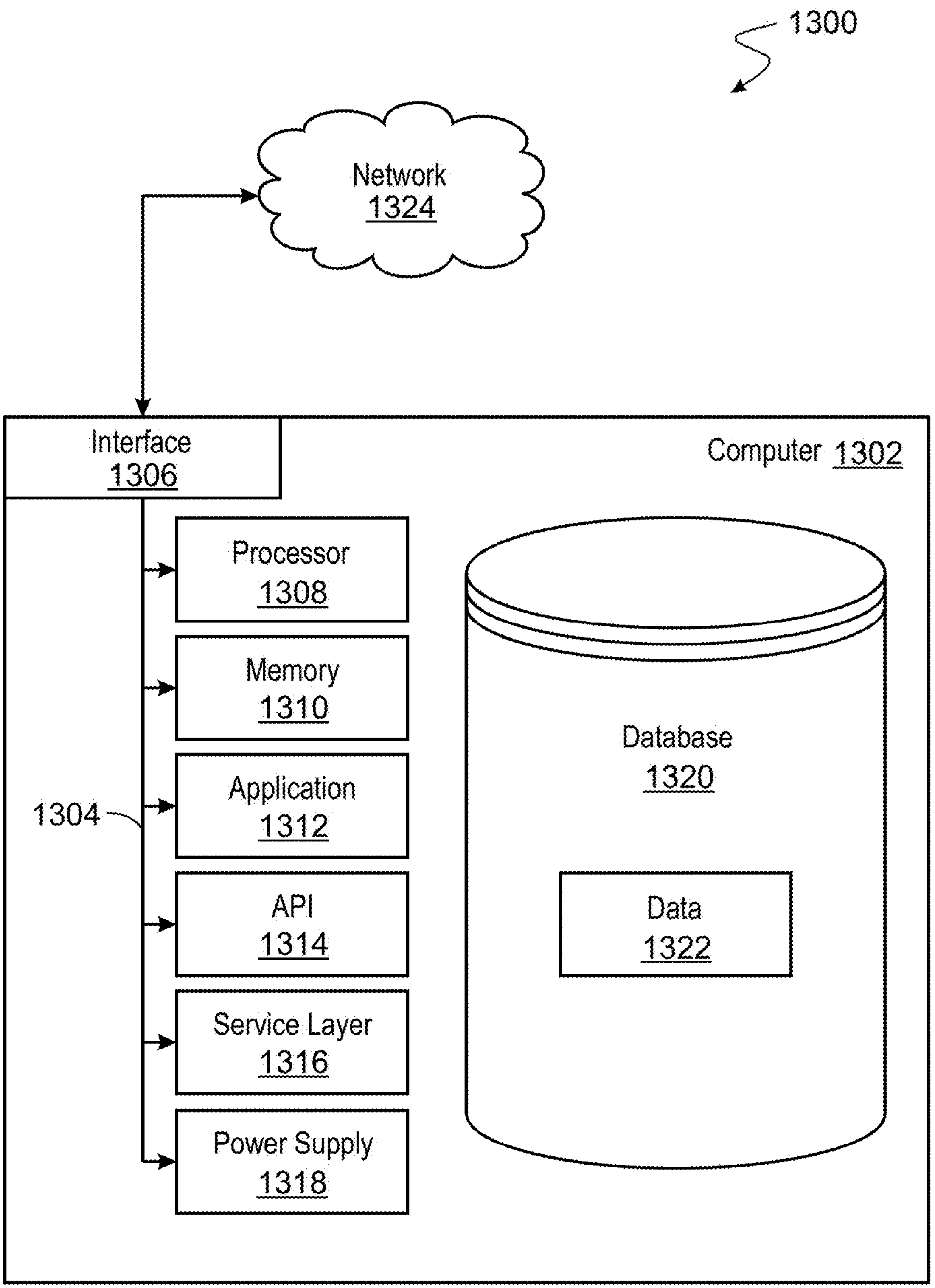
FIG. 13 shows a block diagram illustrating an example computer system used to provide computational functionalities associated with described algorithms, methods, functions, processes, flows, and procedures according to some implementations of the present disclosure.

FIG. 13 shows a block diagram illustrating an example computer system 1300 used to provide computational functionalities associated with described algorithms, methods, functions, processes, flows, and procedures according to some implementations of the present disclosure. For example, the data processing system 1300 can be configured for performing the method of computing a probability of gas exsolution using the CNN based on a seismic cross-section, the chemical information from fluid samples, and the petrophysical information of a formation. The data processing device 1302 can include input devices such as keypads, keyboards, and touch screens that can accept user information. Also, the data processing device 1302 can include output devices that can convey information associated with the operation of the data processing device 1302. The information can include digital data, visual data, audio information, or a combination of information. The information can be presented in a graphical user interface (UI) (or GUI).

The data processing device 1302 can serve in a role as a client, a network component, a server, a database, a persistency, or components of a computer system for performing the subject matter described in the present disclosure. The illustrated data processing device 1302 is communicably coupled with a network 1324. In some implementations, one or more components of the data processing device 1302 can be configured to operate within different environments, including cloud-computing-based environments, local environments, global environments, and combinations of environments.

The data processing device 1302 can receive requests over network 1324 from a client application (for example, executing on another data processing device 1302). The data processing device 1302 can respond to the received requests by processing the received requests using software applications. Requests can also be sent to the data processing device 1302 from internal users (for example, from a command console), external (or third) parties, automated applications, entities, individuals, systems, and computers.

Each of the components of the data processing device 1302 can communicate using a system bus 1304. In some implementations, any or all of the components of the data processing device 1302, including hardware or software components, can interface with each other or the interface 1306 (or a combination of both), over the system bus 1304. Interfaces can use an application programming interface (API) 1314, a service layer 1316, or a combination of the API 1314 and service layer 1316. The API 1314 can include specifications for routines, data structures, and object classes. The API 1314 can be either computer-language independent or dependent. The API 1314 can refer to a complete interface, a single function, or a set of APIs.

The service layer 1316 can provide software services to the data processing device 1302 and other components (whether illustrated or not) that are communicably coupled to the data processing device 1302. The functionality of the data processing device 1302 can be accessible for all service consumers using this service layer. Software services, such as those provided by the service layer 1316, can provide reusable, defined functionalities through a defined interface. For example, the interface can be software written in JAVA, C++, or a language providing data in extensible markup language (XML) format. While illustrated as an integrated component of the data processing device 1302, in alternative implementations, the API 1314 or the service layer 1316 can be stand-alone components in relation to other components of the data processing device 1302 and other components communicably coupled to the data processing device 1302. Moreover, any or all parts of the API 1314 or the service layer 1316 can be implemented as child or sub-modules of another software module, enterprise application, or hardware module without departing from the scope of the present disclosure.

The data processing device 1302 includes an interface 1306. Although illustrated as a single interface 1306 in FIG. 13, two or more interfaces 1306 can be used according to implementations of the data processing device 1302 and the described functionality. The interface 1306 can be used by the data processing device 1302 for communicating with other systems that are connected to the network 1324 (whether illustrated or not) in a distributed environment. Generally, the interface 1306 can include, or be implemented using, logic encoded in software or hardware (or a combination of software and hardware) operable to communicate with the network 1324. More specifically, the interface 1306 can include software supporting one or more communication protocols associated with communications. As such, the network 1324 or the interface's hardware can be operable to communicate physical signals within and outside of the illustrated data processing device 1302.

The data processing device 1302 includes a processor 1308. Although illustrated as a single processor 1308 in FIG. 13, two or more processors 1308 can be used according to implementations of the data processing device 1302 and the described functionality. Generally, the processor 1308 can execute instructions and can manipulate data to perform the operations of the data processing device 1302, including operations using algorithms, methods, functions, processes, flows, and procedures as described in the present disclosure.

The data processing device 1302 also includes a database 1320 that can hold data (such as hydrocarbon production network data 1322) for the data processing device 1302 and other components connected to the network 1324 (whether illustrated or not). For example, database 1320 can be in-memory or a database storing data consistent with the present disclosure. In some implementations, database 1320 can be a combination of two or more different database types (for example, hybrid in-memory and conventional databases) according to implementations of the data processing device 1302 and the described functionality. While database 1320 is illustrated as an internal component of the data processing device 1302, in alternative implementations, database 1320 can be external to the data processing device 1302.

The data processing device 1302 also includes a memory 1310 that can hold data for the data processing device 1302 or a combination of components connected to the network 1324 (whether illustrated or not). In some implementations, memory 1310 can be a combination of two or more different types of memory (for example, a combination of semiconductor and magnetic storage) according to implementations of the data processing device 1302 and the described functionality. While memory 1310 is illustrated as an internal component of the data processing device 1302, in alternative implementations, memory 1310 can be external to the data processing device 1302.

The application 1312 can be an algorithmic software engine providing functionality according to implementations of the data processing device 1302 and the described functionality. For example, application 1312 can serve as one or more components, modules, or applications.

The data processing device 1302 can also include a power supply 1318. The power supply 1318 can include a rechargeable or non-rechargeable battery that can be configured to be either user- or non-user-replaceable.

There can be any number of computers 1302 associated with, or external to, a computer system including the data processing device 1302, with each data processing device 1302 communicating over network 1324. Further, the terms "client," "user," and other appropriate terminology can be used interchangeably, as appropriate, without departing from the scope of the present disclosure. Moreover, the present disclosure contemplates that many users can use one data processing device 1302 and one user can use multiple computers 1302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based).

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random-access memory (RAM), read only memory (ROM), phase change memory (PRAM), static random-access memory (SRAM), dynamic random-access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

IMPLEMENTATIONS

An implementation described in the specification provides a method of drilling a hydrocarbon production well in a subsurface formation. The method includes training a convolutional neural network (CNN) using a set of training data including information of gas exsolution in an oil reservoir, a seismic indicator, a chemical indicator, and a petrophysical indicator. The method further includes providing an input image including a seismic cross-section of a subsurface formation to the CNN, where the subsurface formation includes an uplifted region or a faulted region. The method further includes providing chemical information of hydrocarbons present in a location within the subsurface formation, where the chemical information is obtained from a fluid sample collected from the location. The method further includes providing petrophysical information at the location. The method further includes computing a probability of gas exsolution using the CNN based on the seismic cross-section, the chemical information, and the petrophysical information. The method further includes, based on the probability, identifying locations of structural traps where hydrocarbons accumulate in the subsurface formation.

In an aspect, the method further includes analyzing the fluid sample with a gas chromatography (GC) to obtain the chemical information.

In an aspect, the chemical information includes a ratio of a normal alkane to another normal alkane.

In an aspect, the chemical information includes loss of light-ends.

In an aspect, the chemical information includes compositions of hydrocarbon isomers.

In an aspect, combinable with any other aspect, the method further includes obtaining a C7 oil correlation star diagram to obtain the chemical information.

In an aspect, combinable with any other aspect, the method further includes obtaining a Clayton plot to obtain the chemical information.

In an aspect, combinable with any other aspect, the method further includes obtaining a well log, wherein the well log includes the petrophysical information.

In an aspect, combinable with any other aspect, the method further includes characterizing a core plug collected from the formation to obtain the petrophysical information.

In an aspect, combinable with any other aspect, the petrophysical information include X-ray diffraction (XRD) patterns, porosity, or permeability.

In an aspect, combinable with any other aspect, the petrophysical information include pressure.

In an aspect, combinable with any other aspect, the petrophysical information include a mineralogical composition of the formation.

In an aspect, combinable with any other aspect, the petrophysical information include quartz content at the location.

In an aspect, combinable with any other aspect, the method further includes providing a set of chemical information of hydrocarbons present in a plurality of locations within the formation, where the location is one of the plurality of locations, and the set of chemical information is obtained from a plurality of fluid samples collected from the formation. The method further includes providing a set of petrophysical information at the plurality of locations. The method further includes computing a plurality of probabilities of gas exsolution for the plurality of locations using the CNN based on the seismic cross-section, the set of chemical information, and the set of petrophysical information. The method further includes generating a prediction map based on the plurality of probabilities, the prediction map the represents a spatial distribution of the plurality of probabilities.

Another implementation described in the specification provides an apparatus including a non-transitory, computer readable, storage medium that stores instructions that, when executed by at least one processor, cause the at least one processor to perform operations. The operations include training a convolutional neural network (CNN) using a set of training data including information of gas exsolution in an oil reservoir, a seismic indicator, a chemical indicator, and a petrophysical indicator. The operations further include providing an input image including a seismic cross-section of a formation to the CNN, the formation including an uplifted region or a faulted region. The operations further include providing chemical information of hydrocarbons present in a location within the formation, the chemical information obtained from a fluid sample collected from the location. The operations further include providing petrophysical information at the location. The operations further include computing a probability of gas exsolution using the CNN based on the seismic cross-section, the chemical information, and the petrophysical information. The operations further include, based on the probability, generating or update a hydrocarbon production plan for the formation.

In an aspect, the operations further include obtaining the chemical information by analyzing the fluid sample with a gas chromatography (GC) to obtain the chemical information. The operations further include obtaining the petrophysical information by performing measurements of X-ray diffraction (XRD) patterns, porosity, or permeability.

In an aspect, combinable with any other aspect, computing the probability of gas exsolution using the CNN includes assigning an uplift index or a faulted index to the location based on the seismic cross-section.

Another implementation described in the specification provides a system including: one or more memory modules; one or more hardware processors communicably coupled to the one or more memory modules; and the one or more hardware processors configured to execute instructions stored on the one or more memory modules to perform operations. The operations include training a convolutional neural network (CNN) using a set of training data including information of gas exsolution in an oil reservoir, a seismic indicator, a chemical indicator, and a petrophysical indicator. The operations further include providing an input image including a seismic cross-section of a formation to the CNN, the formation including an uplifted region or a faulted region. The operations further include providing chemical information of hydrocarbons present in a location within the formation, the chemical information obtained from a fluid sample collected from the location. The operations further include providing petrophysical information at the location. The operations further include computing a probability of gas exsolution using the CNN based on the seismic cross-section, the chemical information, and the petrophysical information. The operations further include, based on the probability, generating or updating a hydrocarbon production plan for the formation.

In an aspect, the operations further include obtaining the chemical information by analyzing the fluid sample with a gas chromatography (GC) to obtain the chemical information. The operations further include obtaining the petrophysical information by performing measurements of X-ray diffraction (XRD) patterns, porosity, or permeability.

In an aspect, combinable with any other aspect, computing the probability of gas exsolution using the CNN includes assigning an uplift index or a faulted index to the location based on the seismic cross-section.

A number of embodiments of the systems and methods have been described. Nevertheless, it will be understood that various modifications may be made without departing from the spirit and scope of this specification. Accordingly, other embodiments are within the scope of the following claims.

What is claimed is:

1. A method of drilling a hydrocarbon production well in a subsurface formation, the method comprising:

training a convolutional neural network (CNN) using a set of training data comprising information of gas exsolution in an oil reservoir, a seismic indicator, a chemical indicator, and a petrophysical indicator;

providing an input image comprising a seismic cross-section of a subsurface formation to the CNN, the subsurface formation comprising an uplifted region or a faulted region;

providing chemical information of hydrocarbons present in a location within the subsurface formation, the chemical information obtained from a fluid sample collected from the location;

providing petrophysical information at the location;

computing a probability of gas exsolution using the CNN based on the seismic cross-section, the chemical information, and the petrophysical information; and based on the probability, identifying locations of structural traps where hydrocarbons accumulate in the subsurface formation.

2. The method of claim 1, further comprising analyzing the fluid sample with a gas chromatography (GC) to obtain the chemical information.

3. The method of claim 2, wherein the chemical information comprises a ratio of a normal alkane to another normal alkane.

4. The method of claim 2, wherein the chemical information comprises loss of light-ends.

5. The method of claim 2, wherein the chemical information comprises compositions of hydrocarbon isomers.

6. The method of claim 1, further comprising obtaining a C7 oil correlation star diagram to obtain the chemical information.

7. The method of claim 1, further comprising obtaining a Clayton plot to obtain the chemical information.

8. The method of claim 1, further comprising obtaining a well log, wherein the well log comprises the petrophysical information.

9. The method of claim 1, further comprising characterizing a core plug collected from the formation to obtain the petrophysical information.

10. The method of claim 1, wherein the petrophysical information comprise X-ray diffraction (XRD) patterns, porosity, or permeability.

11. The method of claim 1, wherein the petrophysical information comprise pressure.

12. The method of claim 1, wherein the petrophysical information comprise a mineralogical composition of the formation.

13. The method of claim 1, wherein the petrophysical information comprise quartz content at the location.

14. The method of claim 1, further comprising:

providing a set of chemical information of hydrocarbons present in a plurality of locations within the formation, the location being one of the plurality of locations, the set of chemical information obtained from a plurality of fluid samples collected from the formation;

providing a set of petrophysical information at the plurality of locations;

computing a plurality of probabilities of gas exsolution for the plurality of locations using the CNN based on the seismic cross-section, the set of chemical information, and the set of petrophysical information; and generating a prediction map based on the plurality of probabilities, the prediction map the represents a spatial distribution of the plurality of probabilities.

15. An apparatus comprising a non-transitory, computer readable, storage medium that stores instructions that, when executed by at least one processor, cause the at least one processor to perform operations comprising:

training a convolutional neural network (CNN) using a set of training data comprising information of gas exsolution in an oil reservoir, a seismic indicator, a chemical indicator, a petrophysical indicator;

providing an input image comprising a seismic cross-section of a formation to the CNN, the formation comprising an uplifted region or a faulted region;

providing chemical information of hydrocarbons present in a location within the formation, the chemical information obtained from a fluid sample collected from the location;

providing petrophysical information at the location;

computing a probability of gas exsolution using the CNN based on the seismic cross-section, the chemical information, and the petrophysical information; and based on the probability, generating or update a hydrocarbon production plan for the formation.

16. The apparatus of claim 15, wherein the operations further comprise:

obtaining the chemical information by analyzing the fluid sample with a gas chromatography (GC) to obtain the chemical information; and obtaining the petrophysical information by performing measurements of X-ray diffraction (XRD) patterns, porosity, or permeability.

17. The method of claim 15, wherein computing the probability of gas exsolution using the CNN comprises assigning an uplift index or a faulted index to the location based on the seismic cross-section.

18. A system, comprising:

one or more memory modules; and one or more hardware processors communicably coupled to the one or more memory modules, the one or more hardware processors configured to execute instructions stored on the one or more memory modules to perform operations comprising:

training a convolutional neural network (CNN) using a set of training data comprising information of gas exsolution in an oil reservoir, a seismic indicator, a chemical indicator, and a petrophysical indicator;

providing an input image comprising a seismic cross-section of a formation to the CNN, the formation comprising an uplifted region or a faulted region;

providing chemical information of hydrocarbons present in a location within the formation, the chemical information obtained from a fluid sample collected from the location;

providing petrophysical information at the location;

computing a probability of gas exsolution using the CNN based on the seismic cross-section, the chemical information, and the petrophysical information; and based on the probability, generating or updating a hydrocarbon production plan for the formation.

19. The apparatus of claim 18, wherein the operations further comprise:

obtaining the chemical information by analyzing the fluid sample with a gas chromatography (GC) to obtain the chemical information; and obtaining the petrophysical information by performing measurements of X-ray diffraction (XRD) patterns, porosity, or permeability.

20. The method of claim 18, wherein computing the probability of gas exsolution using the CNN comprises assigning an uplift index or a faulted index to the location based on the seismic cross-section.

* * * * *